United States Patent
Campbell et al.

(10) Patent No.: US 10,303,352 B2
(45) Date of Patent: May 28, 2019

(54) NAVIGATING LONG DISTANCES ON NAVIGABLE SURFACES

(71) Applicant: Microsoft Technology Licensing, LLC, Redmond, WA (US)

(72) Inventors: Johnny S. Campbell, Woodinville, WA (US); Safiya Bhojawala, Seattle, WA (US); Samuel Radakovitz, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 313 days.

(21) Appl. No.: 15/198,596

(22) Filed: Jun. 30, 2016

(65) Prior Publication Data

US 2018/0004405 A1   Jan. 4, 2018

(51) Int. Cl.
*G06F 3/048* (2013.01)
*G06F 3/0485* (2013.01)
*G06F 3/0488* (2013.01)
*G06F 3/041* (2006.01)

(52) U.S. Cl.
CPC ........ *G06F 3/04855* (2013.01); *G06F 3/0412* (2013.01); *G06F 3/0485* (2013.01); *G06F 3/04883* (2013.01); *G06F 3/04886* (2013.01); *G06F 2203/04104* (2013.01)

(58) Field of Classification Search
CPC .......................... G06F 3/0485; G06F 3/04883
See application file for complete search history.

(56) References Cited

U.S. PATENT DOCUMENTS

| | | | |
|---|---|---|---|
| 5,506,951 A | 4/1996 | Ishikawa | |
| 5,550,559 A | 8/1996 | Isensee et al. | |
| 8,291,341 B2 | 10/2012 | Tseng et al. | |
| 2008/0168349 A1 | 7/2008 | Lamiraux et al. | |
| 2009/0325607 A1* | 12/2009 | Conway | G06F 1/1624 455/456.3 |
| 2010/0107066 A1 | 4/2010 | Hiitola et al. | |
| 2011/0252362 A1 | 10/2011 | Cho et al. | |

(Continued)

FOREIGN PATENT DOCUMENTS

| | | |
|---|---|---|
| CN | 102023791 A | 4/2011 |
| EP | 2521022 A2 | 11/2012 |
| WO | 1998037506 A2 | 8/1998 |

OTHER PUBLICATIONS

Power of the Swipe, Xue Dou, 2016.*

(Continued)

*Primary Examiner* — William L Bashore
*Assistant Examiner* — Rayeez R Chowdhury
(74) *Attorney, Agent, or Firm* — Merchant & Gould P.C.

(57) ABSTRACT

Aspects disclosed herein relate to the use of navigational control UI elements to aid in navigating large surfaces on a touchscreen device. The navigational control UI element may be operable to facilitate traversal of the navigable surface along the axis upon which the navigational control UI element is placed. In alternate examples, the navigational control element may be operable to provide functionality to traverse or adjust the navigable surface along both the horizontal vertical axes. In still further aspects, other types of navigational control UI elements may provide the ability to directly jump to a specific position on the navigable surface.

20 Claims, 17 Drawing Sheets

(56) References Cited

U.S. PATENT DOCUMENTS

| | | | |
|---|---|---|---|
| 2012/0072444 A1* | 3/2012 | Sharp | G06F 3/0481 |
| | | | 707/769 |
| 2012/0218305 A1 | 8/2012 | Patterson et al. | |
| 2012/0280922 A1* | 11/2012 | Lee | G06F 3/04847 |
| | | | 345/173 |
| 2013/0104074 A1* | 4/2013 | Takahashi | G06F 3/0488 |
| | | | 715/784 |
| 2014/0292760 A1 | 10/2014 | Shikolay | |
| 2015/0116371 A1* | 4/2015 | Jun | G09G 5/34 |
| | | | 345/684 |
| 2015/0261771 A1 | 9/2015 | Coudron | |

OTHER PUBLICATIONS

"International Search Report and Written Opinion Issued in PCT Application No. PCT/US2017/038902", dated Sep. 11, 2017, 10 Pages.

* cited by examiner

FIG. 12

NAVIGATING LONG DISTANCES ON NAVIGABLE SURFACES

BACKGROUND

A large number of devices incorporate touchscreen interfaces. Many of these devices are devices with a small form factor, such as a smartphone or tablet. Navigating large surfaces using a touch interface and touch gestures may prove difficult when working with some applications. Examples of such applications include productivity applications, such as word processing applications, spreadsheet applications, presentations, and the like. Using these applications, users may create large documents, spreadsheets, or presentations. The size of these files result in a large navigable surface that must be traversed to reach different portions of content. It is often hard to quickly and efficiently navigate such large surfaces using a traditional touch interface and touch gestures.

It is with respect to these and other general considerations that embodiments have been described. Also, although relatively specific problems have been discussed, it should be understood that the embodiments should not be limited to solving the specific problems identified in the background.

SUMMARY

The disclosure generally relates to use of navigational control UI elements to aid in navigating large surfaces. The navigational control UI element may be operable to facilitate traversal of the navigable surface along the axis upon which the navigational control UI element is placed. In alternate examples, the navigational control element may be operable to provide functionality to adjust the navigable surface along both the horizontal vertical axes. For example, the navigational UI control may provide joystick-like capabilities to allow for 360 degrees of traversal. In still further aspects, other types of navigational control UI elements may provide the ability to directly jump to a specific position on the navigable surface. The specific positions may be user defined or may be automatically determined by an application incorporating the navigational control UI element. Additional aspects of the present disclosure relate to activating navigation zones that are operable to act similar to the navigational controls without actually displaying a graphical control element. Still further aspects of the present disclosure relate to identifying recognizable features that may be used to aid in the navigation of the large surfaces.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

FIG. 12 illustrates an exemplary modification of a navigational control element during traversal.

DETAILED DESCRIPTION

Figure 1:
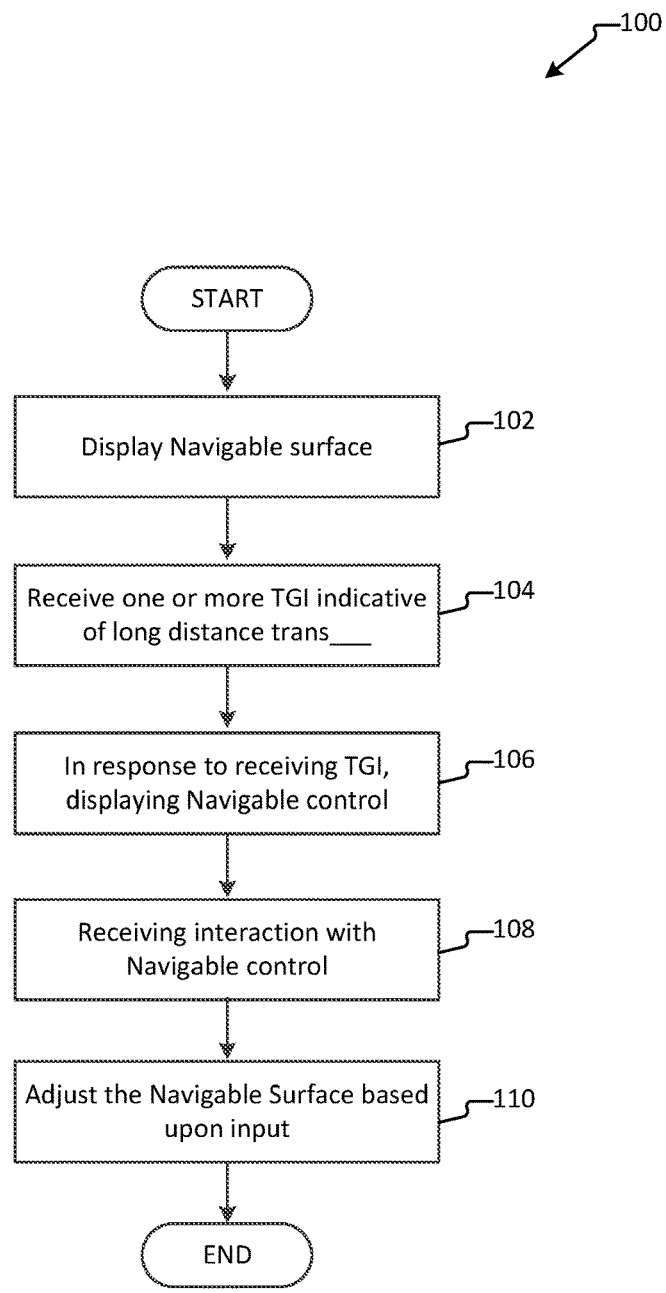
FIG. 1 illustrates an exemplary method for traversing long distances on a navigable surface using touch input.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

A large number of devices incorporate touchscreen interfaces. Many of these devices are devices with a small form factor, such as a smartphone or tablet. As these small form factor devices continue to increase in computing power, more applications are being designed to run on such devices. Examples of such applications include productivity applications, such as word processing applications, spreadsheet applications, presentations, and the like. Using these applications, users may create large documents, spreadsheets, or presentations. The size of these files result in a large navigable surface that must be traversed to reach different portions of content. It is often hard to quickly and efficiently navigate such large surfaces using a traditional touch interface and touch gestures.

Aspects disclosed herein relate to the use of navigational control UI elements to aid in navigating large surfaces. The navigational control UI element may be operable to facilitate traversal of the navigable surface along the axis upon which the navigational control UI element is placed. In alternate examples, the navigational control element may be operable to provide functionality to traverse or adjust the navigable surface along both the horizontal vertical axes. For example, the navigational UI control may provide joystick-like capabilities with allow for 360 degrees of traversal. In still further aspects, other types of navigational control UI elements may provide the ability to directly jump to a specific position on the navigable surface. The specific positions may be user defined or may be automatically determined by an application incorporating the navigational control UI element. Additional aspects of the present disclosure relate to activating navigation zones that are operable to act similar to the navigational controls without actually displaying a graphical control element. For example, if a few touch gestures (e.g., swipes, flicks, etc.) are received in a row, navigation of the navigable surface may be accelerated in a direction indicated by the touch gestures. In one aspect, the navigation may continue to accelerate to a maximum speed which may be predetermined or may be dynamically determined based upon the size of the navigable surface. For example, a faster maximum speed may be allowed for larger surfaces than smaller surfaces. Navigation may continue at the maximum speed until another input is received (e.g., an input indicative of a user touching the screen). Upon receiving the additional input, navigation may stop at the current location or may decelerate over time. Still further aspects of the present disclosure relate to identifying recognizable features that may be used to aid in the navigation of the large surfaces.

FIG. 1 illustrates an exemplary method 100 for traversing long distances on a navigable surface using touch input. FIG. 1 may be performed using a computing device such as a smartphone, a laptop, a server, a smartwatch, a wearable device, etc. In certain aspects, a touch interface may be employed by the device performing the method 100. In other aspects, other types of interfaces may be employed, such as a mouse, a trackpad, a voice interface, or any other type of input interface. While the exemplary method 100 is described as receiving touch input, one of skill in the art will appreciate that other types of input may be received without departing from the spirit of this disclosure.

Flow begins at operation 102 where a navigable surface is displayed. A navigable surface may be any type of electronic surface that is capable of being navigated. Navigating a navigable surface may include adjusting the currently displayed view of the surface by scrolling, swiping, jumping to a point of interest, or otherwise traversing the surface. Exemplary navigable surfaces include, but are not limited to, web pages, documents, spreadsheets, home screens, desktops, presentations, diagrams, images, etc. In aspects, a navigable surface may be a single electronic object, such as, for example, a single image. Alternatively, a navigable surface may comprise multiple electronic objects. As an example, a spreadsheet including various tables, charts, images, etc. may be a navigable surface.

In one aspect, the navigable surface may be displayed on a touchscreen; however, the navigable surface may be displayed on other types of displays without departing from the scope of this disclosure. The navigable surface may be displayed in response to accessing an electronic object such as, for example, a file. As an example, the navigable surface may be displayed in response to opening a spreadsheet, a document, a presentation, upon accessing a website, upon startup of a device, etc. In certain aspects, displaying the navigable surface may include displaying one or more user interface (UI) elements in addition to the navigable surface. UI elements associated with a word processor, a web browser, as spreadsheet application, etc., may be displayed with the navigable surface. The UI elements may be part of the navigable surface, e.g., reside on the surface, or may be separate from the navigable surface. In certain aspects, displaying the navigable surface may also include displaying a size indicator UI element that indicates the size of the navigable surface. The displayed size of the size indicator may depend upon the size of the navigable surface. For example, a smaller navigable surface may result in the generation of a larger size indicator UI element while a larger navigable surface may result in the generation of a smaller size indicator UI element. In examples, the size indicator UI element may be positioned along an axis upon which the navigable surface can be traversed. The size indicator UI element may provide an indication of the size of the traversable content for the navigable surface along the direction of the axis upon which the size indicator UI element is placed.

Flow continues to operation 104 where one or more inputs directed to the navigable surface are received. The one or more inputs may be received via interaction with the navigable surface itself. In certain aspects, the one or more inputs may be touch input received via a touch display. In such examples the one or more inputs may be touch inputs to slide the navigable surface in a particular direction. Alternatively, or additionally, the one or more touch inputs may be gesture inputs. For example, a flick gesture may be received. As previously noted, other types of inputs received from other types of interfaces may be received at operation 104 without departing from the scope of this disclosure.

Upon receiving one or more inputs, the navigable surface may be adjusted according to the received gesture at operation 106. Adjusting the navigable surface may include traversing the navigable surface in a direction specified by the one or more received inputs. Traversal of the navigable surface results in the display of portions of the navigable surface that previously resided outside of the display area. Portions of the navigable surface that were previously displayed may be moved outside of the display area such that the previously displayed portions are no longer displayed. In addition to adjusting the navigable surface, a navigation control UI element may be presented at operation 104. In one aspect, the navigation control UI element may be presented concurrently at the same time the traversal of the navigable surface is performed. In one example, the navigation control UI element may continue to display after the adjustment of the navigable surface has completed. In such example, if no input is received by the navigational control UI element within a predetermined period of time, the navigational control UI element may be removed from the display. Alternatively, the navigational UI may only be displayed during the adjustment of navigable surface.

The navigation control UI element may have different forms. For example, the navigation control UI element may be a scrollbar, a search interface, a button, a textual display object, a graphical display object, etc. Exemplary navigational UI elements are provided in FIGS. 2-6, 11-12, and 3-14; however, one of skill in the art will appreciate that other types of UI elements may be employed without departing from the scope of this disclosure. In certain aspects, the navigational control UI element is displayed in addition to the size indicator UI element. In one example, the navigational control UI element may be positioned relative to the size indicator UI element. In one example, the navigational control UI element may be positioned along an axis of travel. For example, a navigational control UI element may be placed along a horizontal or vertical axis. In such embodiments, the navigational control UI element may be operable to facilitate traversal of the navigable surface along the axis upon which the navigational control UI element is placed. In alternate examples, the navigational control element may be operable to provide traversal of the navigable surface along both the horizontal vertical axes. For example, the navigational UI control may provide joystick-like capabilities with allow for 360 degrees of traversal. In still further aspects, other types of navigational control UI elements may provide the ability to directly jump to a specific position on the navigable surface. The specific positions may be user defined or may be automatically determined by an application incorporating the navigational control UI element.

Flow continues to operation 108 where one or more inputs are received via the navigational control UI element. In examples, the one or more inputs may be received via a user interaction with the navigational control UI element. The format of the received input may vary depending on the type of navigational control UI element that is displayed. For example, if the navigational control UI element is a scrollbar, the scrollbar may be manipulated by touching the and moving the scrollbar along an axis of movement. If the navigational control element is a search interface, search terms may be provided using a soft keyboard, a keyboard, an automatic speech recognition interface, or the like. Touch gestures may be used to manipulate the navigational control UI element. For example, the navigational control UI element may be dragged, flicked, held, or otherwise manipulated using a touch interface. Traditional interfaces such as keyboards, directional keypads, and a mouse may also be used to manipulate the navigational control interface. The navigational control UI element is operable to provide additional functionality to navigation and/or traverse of the navigable surface that is not attainable via traditional inputs, such as touch gesture inputs. The additional functionality makes it easier for a user to traverse the navigable surface to find desired content. For example, the control frees the user from continually having to flick a tough input interface, such as a touchscreen, in order to navigate to desired content. The navigational control UI element may provide improved navigational control using a touch interface that is not possible via traditional touch gestures. As such, the various aspects disclosed herein provide many Accordingly, the present disclosure provides a plurality of technical benefits including but not limited to: improved user experience, reduced CPU utilization, increased battery life, flexible implementation options, improved efficiency and quality for applications/services utilizing examples of the present disclosure, among other examples.

Upon receiving the one or more inputs at the navigational control UI element, flow proceeds to operation 110. At operation 110, the navigable surface is traversed or adjusted based upon the input received by the navigational control UI element. The type of traversal performed may be dependent upon the type of navigational control UI element and/or the type of input received by the navigational control UI element. For example, if the navigational control UI element is a scrollbar, the traversal may be performed by scrolling the navigable content in the direction of the movement of the scrollbar. If the navigational control UI is a search interface, traversing the navigable content may be performed by displaying a portion of the navigable surface that is identified by received search parameters.

Figures 2A, 2B, 2C:
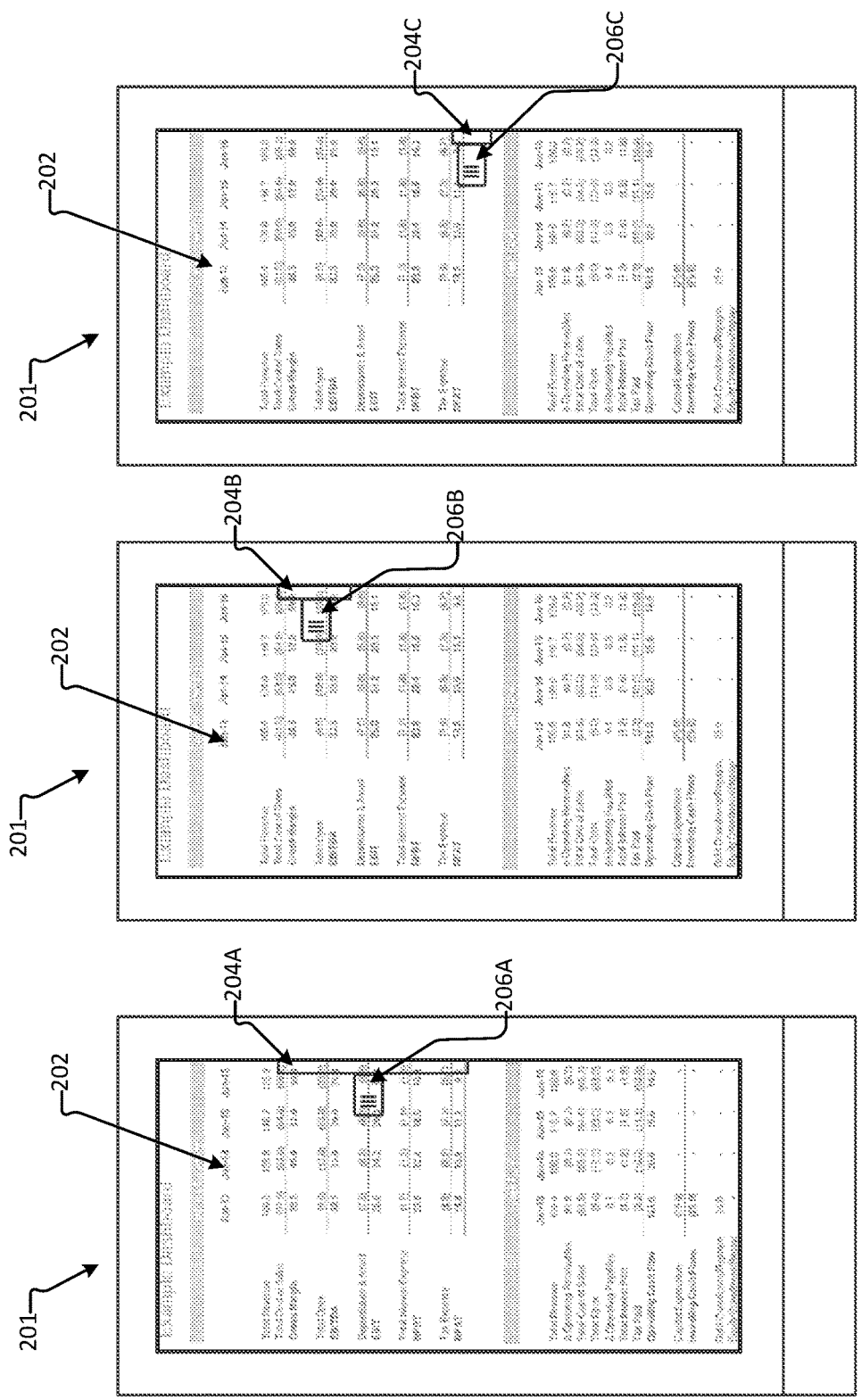
FIGS. 2A-2C provide various examples of a navigable control UI element displayed along with a size indicator UI element.

FIGS. 2A-2C provide various examples of a navigable control UI element displayed along with a size indicator UI element. FIG. 2A provides an exemplary view of UI components for a navigable surface 202. In the illustrated example, a navigable surface 202 is displayed on a device 201. In the illustrated example, device 201 may be a smartphone having a touch display. The navigable surface 202A may be any type of navigable surface, such as, a spreadsheet, document, web page, etc. The aspect displayed in FIG. 2A includes a size indicator UI element 204A and a navigational control UI element 206A. In the depicted aspect, the navigational control UI element 206A is a scrollbar. As previously discussed, the size of the size indicator UI element 204A may be determined based upon the size of the navigable surface. In examples, the size of the size indicator element may be inversely proportional to the size of the navigable surface 202. That is, the larger the size indicator UI element the smaller the navigable surface. Similarly, the smaller the size indicator UI element the larger the navigable surface. Alternative methods may be employed to determine the size of the size indicator UI element without departing from the spirit of this disclosure. FIGS. 2A-2C display various navigable surfaces 202A-202C that increase in size. As such, size indicator 204A is larger than size indicator 204B which, in turn, is larger than size indicator 204C. In certain aspects, the size of the size indicator UI element may not be smaller than the navigational control element. For example, size indication UI element 204C is illustrating having a length that is substantially similar to the length of navigational control UI element 206C. Placing a lower limit on the size of a size indicator UI element may provide benefits such as ensuring that the size indicator UI element is easily visible to the user, However, as is shown in FIGS. 2A-2C, the navigable control elements 206A-206C remain a constant size. The size of the navigable control element may be determined based upon the type of the navigational control UI element. Additionally, or alternatively, the size of the navigable control element may be determined based upon the type of touch gesture interaction that the navigable control UI element is configured to receive.

In the various aspects depicted in FIGS. 2A-2C, the UI elements are illustrated as being transparent. Providing a transparent navigable control element and/or transparent size indicator element allow the user to view content on the navigable surface that is under the UI element. This is advantageous when the navigable surface is displayed on a device having a small display or a small form factor because of the limited display area. However, it is not required that the UI elements disclosed herein be transparent. In additional aspects, the UI elements may be opaque or have varying degrees of transparency. In certain aspects, the level of transparency of a navigational control UI element may differ from the level of transparency of a size indicator UI element. In other aspects, the different UI elements may be displayed having a texture, a color, or other display characteristics as are known to the art.

Figures 3, 4, 5:
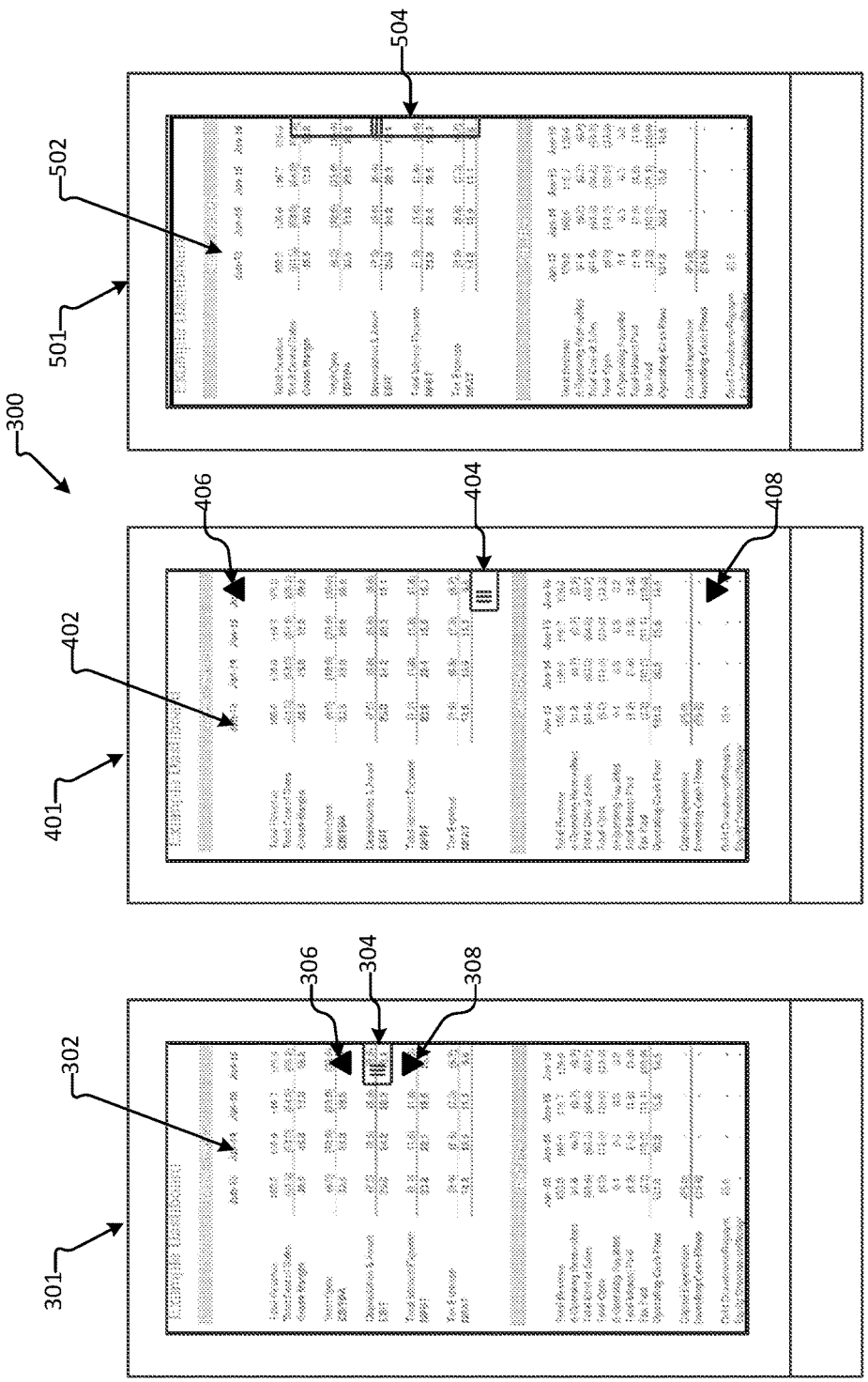
FIG. 3 provides an exemplary illustration of various navigational control UI elements that can be employed with the various aspects disclosed herein.
FIG. 4 provides an exemplary illustration of various additional navigational control UI elements that can be employed with the various aspects disclosed herein.
FIG. 5 depicts an alternate example of a scrollbar that may be employed with the various aspects disclosed herein.

FIG. 3 provides an exemplary illustration of various navigational control UI elements that can be employed with the various aspects disclosed herein. FIG. 3 provides an exemplary device 301 displaying a navigable surface 302. The navigable surface 302 may be displayed on a touchscreen display or on a conventional display. While the aspects in FIGS. 2A-2C depicted a single navigational control element, namely, as scrollbar, FIG. 3 depicts multiple navigational control elements displayed simultaneously. The various navigational control UI elements depicted include a scrollbar 304, a page up control 306, and a page down control 308. In certain aspects, the scrollbar 304 is configured to receive touch input. As an example, if a user touches the scrollbar 304 the user may be able to traverse the navigable surface by dragging the scrollbar 304 along the axis upon which it is positioned. Page up control 306 may be operable to transition the navigable surface down by the length of the display. That is, upon receiving input the page up control 306 is operable to display the content residing in an area of the navigable surface that is directly above the area of the navigable surface being displayed at the time that the input is received. In various aspects, different graphical transitions may be employed to display the new portion of the navigable surface. For example, the page up control 306 may be operable to automatically scroll the navigable surface down the length of a screen. Alternatively, the portion of the navigable surface directly above the displayed area may be displayed without a transition upon the receipt of input by the page up control 306. One of skill in the art will appreciate that different graphical transitions may employed to display the selected content without departing from the scope of this disclosure.

The page down control 308 may be operable to transition the navigable surface up by the length of the display. That is, upon receiving input the page down control 308 is operable to display the content residing in an area of the navigable surface that is directly below the area of the navigable surface being displayed at the time that the input is received. Different graphical transitions may be employed to display the new portion of the navigable surface. For example, the page up control 306 may be operable to automatically scroll the navigable surface up the length of a screen. Alternatively, the portion of the navigable surface directly below the displayed area may be displayed without a transition upon the receipt of input by the page down control 308. One of skill in the art will appreciate that different graphical transitions may employed to display the selected content without departing from the scope of this disclosure.

As will be described in further detail below, a navigable surface may include various features. As an example, in the instance of the navigable surface being a spreadsheet surface, the spreadsheet may include various different features such as different tables, graphs, charts, and images. Each of these features may be identified and used during navigation of the navigable surface. If various different features have been identified for the navigable surface, the page up control 306 and page down control 308 may be operable to transition to the next identified feature in their respective directions.

FIG. 4 provides an exemplary illustration of various additional navigational control UI elements that can be employed with the various aspects disclosed herein. FIG. 4 illustrates an exemplary device 401 displaying a navigable surface 402. The navigable surface 402 may be displayed on a touchscreen display or on a conventional display. FIG. 4 illustrates a scrollbar 404, a home control 406, and an end control 408. In certain aspects, the scrollbar 404 is configured to receive touch input. As an example, if a user touches the scrollbar 404 the user may be able to traverse the navigable surface by dragging the scrollbar 404 along the axis upon which it is positioned. The home control 406 may be operable to display the initial portion of the navigable surface. That is, in the depicted aspect, the home control element 406 may be operable to transition the display to the top of the navigable surface 402. Different graphical transitions may be employed to display the new portion of the navigable surface. For example, the home control 406 may be operable to automatically scroll the navigable surface to the top edge of the navigable surface. Alternatively, the top edge of the navigable surface may be displayed without a transition upon the receipt of input by the home control 406.

Similarly, the end control 408 may be operable to transition the final portion of the navigable surface. That is, in the depicted aspect, the home control element 408 may be operable to transition the display to the bottom of the navigable surface 402. Different graphical transitions may be employed to display the new portion of the navigable surface. For example, the end control 408 may be operable to automatically scroll the navigable surface to the bottom edge of the navigable surface. Alternatively, the bottom edge of the navigable surface may be displayed without a transition upon the receipt of input by the end control 408. While the home control 406 and end control 408 have been described as transitioning to the initial or end portions of the navigable surface, one of skill in the art will understand that the functionality of these controls is not limited to transitioning to the beginning or end of a navigable surface. Instead, one of skill in the art will appreciate that the controls may be operable to transition the navigable surface to display content residing at the boundary of the navigable surface in the direction of the control. Alternatively, or additionally, the controls 406 and 408 may be operable to transition the surface based upon various identified features of the surface. If various different features have been identified for the navigable surface, the home control 406 and end control 408 may be operable to transition to the last identified feature in their respective directions.

FIG. 5 depicts an alternate example of a scrollbar that may be employed with the various aspects disclosed herein. FIG. 5 depicts a navigable surface 502 displayed on a device 501. A scrollbar 504 is displayed above the navigable surface. The scrollbar 504 is configured to receive touch input. As an example, if a user touches the scrollbar 504 the user may be able to traverse the navigable surface by dragging the scrollbar 504 along the axis upon which it is positioned. Unlike the exemplary scrollbars displayed in FIGS. 2A-2C, the size of the scrollbar 504 may be determined based upon the size of the navigable surface 501. In examples, the size of the size scrollbar 504 may be inversely proportional to the size of the navigable surface 502. That is, the larger the scrollbar 504 the smaller the navigable surface 502. Similarly, the smaller the scrollbar 504 the larger the navigable surface 502. Alternative methods may be employed to determine the size of the size indicator UI element without departing from the spirit of this disclosure. In the aspects depicted in FIG. 5, the scrollbar 504 may be displayed without a size indicator UI element because the information typically conveyed by the size indicator UI element is conveyed by the scrollbar 504. As discussed with respect to the exemplary scrollbars of FIGS. 2A-2C, the scrollbar 502 may be transparent or opaque.

While each of the aspects depicted in FIGS. 2-5 display a navigational control UI element positioned along a vertical axis, one of skill in the art will appreciate that a navigational control UI element may be positioned along axis that the navigable surface spans. Similarly, navigational control elements may be displayed upon multiple axes simultaneously. In still further aspects, the navigational control elements may be operable to automatically adjust its position based upon the orientation of the display. For example, if the display orientation moves from a portrait orientation to a landscape orientation, the navigational control UI element may automatically transition such that it is displayed along a different edge of the display. This ensures that the navigational control UI element maintains a position along the correct axis despite a change in the orientation of the display. Furthermore, transitioning the navigational control element from one edge of a display to another edge of the display may include resizing the navigational control UI element. Because the edges of the display may have different lengths, the size of the navigational control UI element may be adjusted proportionally based upon the size of the display edge.

Figure 6:
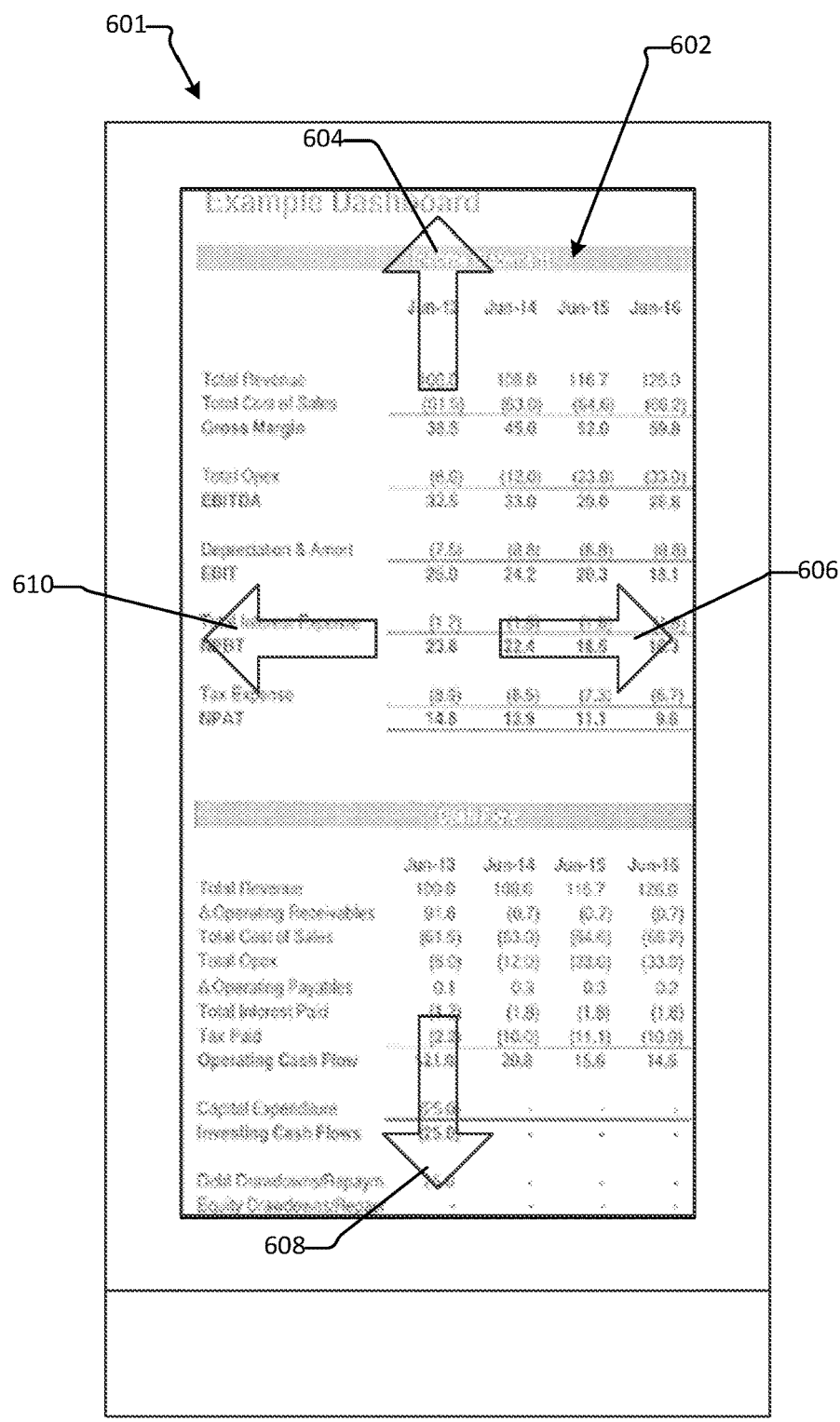
FIG. 6 depicts an embodiment of navigational control elements operable to traverse a navigable surface along multiple axes.

FIG. 6 depicts an embodiment of navigational control elements operable to traverse a navigable surface along multiple axes. FIG. 6 illustrates an exemplary device 601 displaying a navigable surface 602. The navigable surface 602 may be displayed on a touchscreen display or on a conventional display. The navigable surface 602 spans both the vertical and horizontal directions. In the depicted aspect, navigational control elements 604, 606. 608, and 610 are be positioned along the edges of the navigable surface 602. The navigational control elements 604, 606. 608, and 610 may be operable receive input, such as, for example, touch input, and in response adjust the navigable surface 602 in the direction of the edge upon which the navigational controls are displayed. For example, if a user taps navigational control element 604, the navigational control element may be operable to adjust the navigable surface in an upward direction. The length of the adjustment may be predefined. For example, the length may be a screen's length, half a screens length, a predefined number of pixels, etc. Alternatively, the length of traversal may depend upon the type of the navigable surface 602 and/or the content displayed on the navigable surface 602. For example, if the navigable surface 602 is a spreadsheet, navigational control element 604 may be operable to adjust the navigable surface upwards by a cell.

While the navigational control elements 604, 606. 608, and 610 are depicted as being arrows, one of skill in the art will appreciate the navigational elements 604, 606. 608, and 610 may have other forms and do not necessarily have to be arrows. As previously discussed, the navigational control elements 604, 606. 608, and 610 may be transparent or opaque. The navigational control elements 604, 606. 608, and 610 may also be operable to disappear from the display if they do not receive input within a predetermined period of time. Alternatively, if one of the navigational controls 604, 606. 608, and 610 receive input, the navigational control that received the input may continue to be displayed and the other navigational control elements may be removed from the display.

Figure 7:
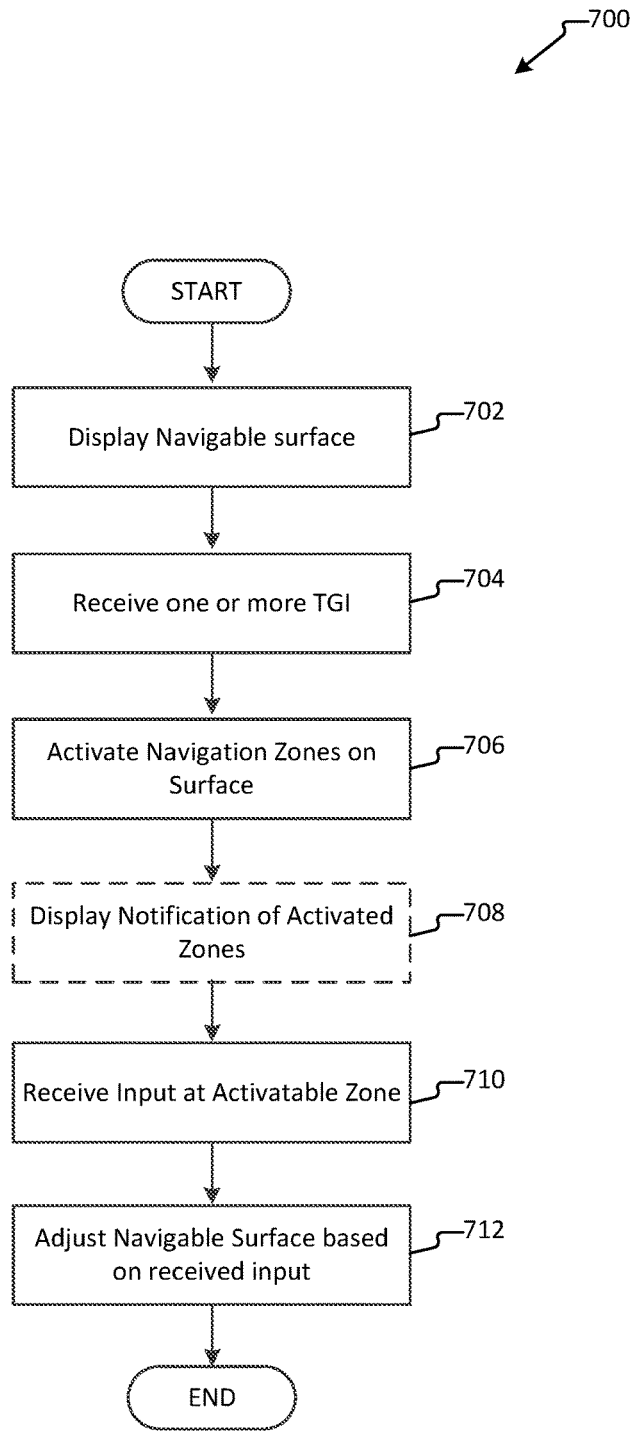
FIG. 7 illustrates an exemplary method for traversing long distances on a navigable surface using touch input without displaying navigational control UI elements.

To this point, the various aspects disclosed herein have been operable to display a navigational control UI element that a user can interact with. Displaying actual navigational control UI elements may be beneficial to alert the user that navigational controls exist that can be utilized to traverse a navigable surface. However, if a user is familiar with the controls, it may be beneficial to provide the capabilities of the navigational controls without actually displaying a navigational control UI element on a display, particularly when the user is operating a small display such as a display on a smartphone, a smartwatch, or other wearable devices. FIG. 7 illustrates an exemplary method 700 for traversing long distances on a navigable surface using touch input without displaying navigational control UI elements. FIG. 7 may be performed using a computing device such as a smartphone, a laptop, a server, a smartwatch, a wearable device, etc. In certain aspects, a touch interface may be employed by the device performing the method 700. In other aspects, other types of interfaces may be employed, such as a mouse, a trackpad, a voice interface, or any other type of input interface. While the exemplary method 700 is described as receiving touch input, one of skill in the art will appreciate that other types of input may be received without departing from the spirit of this disclosure.

Flow begins at operation 702 where a navigable surface is displayed. A navigable surface may be any type of electronic surface that is capable of being navigated. Navigating a navigable surface may include adjusting the currently displayed view of the surface by scrolling, swiping, jumping to a point of interest, or otherwise traversing the surface. Exemplary navigable surfaces include, but are not limited to, web pages, documents, spreadsheets, home screens, desktops, presentations, diagrams, images, etc. In aspects, a navigable surface may be a single electronic object, such as, for example, a single image. Alternatively, a navigable surface may comprise multiple electronic objects. As an example, a spreadsheet including various tables, charts, images, etc. may be a navigable surface.

Flow continues to operation 704 where one or more inputs directed to the navigable surface are received. The one or more inputs may be received via interaction with the navigable surface itself. In certain aspects, the one or more inputs may be touch input received via a touch display. In such examples the one or more inputs may be touch inputs to slide the navigable surface in a particular direction. Alternatively, or additionally, the one or more touch inputs may be touch gesture inputs. For example, a flick gesture may be received. As previously noted, other types of inputs received from other types of interfaces may be received at operation 104 without departing from the scope of this disclosure.

Figure 8B:
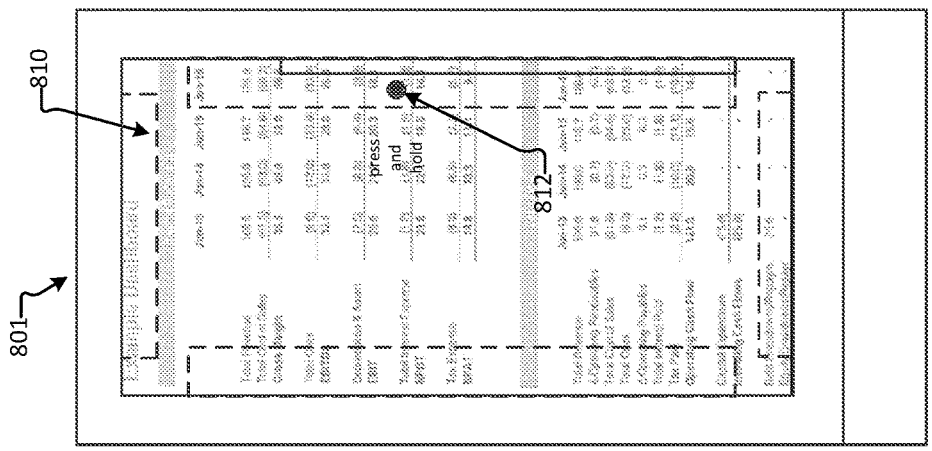
FIG. 8B depicts an exemplary notification indicating the activation of a navigation zone.
Figure 8A:
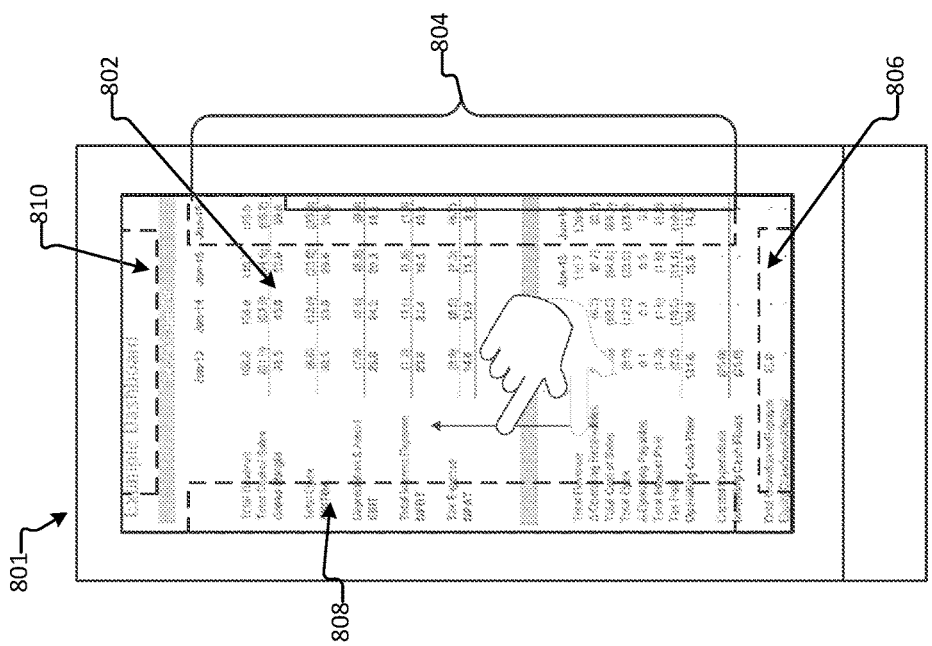
FIG. 8A depicts various navigation zones that may be activated upon receiving one or more touch gesture inputs.

Upon receiving the one or more touch, one or more navigation zones may be activated during operation 706. In certain aspects, a navigation zone may be an area of the display upon which a navigational control UI element would traditionally be displayed. The navigation zones may be operable to receive input and translate the input to perform operations as a displayed navigational control UI element without actually displaying the UI element. For example, FIG. 8A depicts various navigation zones that may be activated upon receiving one or more touch gesture inputs on the navigable surface 802, such as a flick. As depicted in FIG. 8A, different navigation zones 804, 806, 808, and 810 may be activated along the display. Any touch input received in the activated navigation zones 804, 806, 808, and 810 may result in traversal of the navigable surface 802 as if a navigational control UI element had received the input. For example, touch input received along the exterior of the display may be operable to act as if the user had interacted with a scrollbar, a page up or page down control, or any other type of navigational control elements disclosed herein.

Returning to FIG. 7, upon activating the navigation zones, flow continues to optional operation 708. During optional operation 708, a notification may be displayed that informs the user that one or more navigation zones have been activated. The notification may be a textual display, an audio notification, and/or a tactile notification. As an example, FIG. 8B depicts an exemplary notification 810 indicating the activation of a navigation zone. The exemplary indication 810 may include a graphical indication of the navigational zone area. Alternatively, or additionally, the notification 810 may be provided with instructions on how to interact with the navigational zone. For example, if the navigational zone is a directional arrow or a scrollbar, the user may be instructed to "press and hold" the navigation zone. The exemplary notification may be provided the first time the navigation zone is activate, a predetermined amount of times, or every time the navigation zone is activated.

Returning again to FIG. 7, flow continues to operation 710 where input is received at the location of the activated navigation zone. The input may be received in the form of a touch, of a gesture, or via another input device such as a mouse, a stylus, and the like. Upon receiving the input, flow continues to operation 710 where the navigable surface is adjusted based upon the received input. The navigable surface is traversed or adjusted based upon the input received at the navigation zone. The type of traversal performed may be dependent upon the type of navigational control element that the navigation zone is emulating and/or the type of input received at the navigation zone. For example, if the navigation zone is emulating a scrollbar, the adjustment may be performed by scrolling the navigable content in the direction of the movement of the scrollbar.

In further examples, navigation may be performed without activating a navigation zone. For example, if a few touch gestures (e.g., swipes, flicks, etc.) are received in a row, navigation of the navigable surface may be accelerated in a direction indicated by the touch gestures. In one aspect, the navigation may continue to accelerate to a maximum speed which may be predetermined or may be dynamically determined based upon the size of the navigable surface. For example, a faster maximum speed may be allowed for larger surfaces than smaller surfaces. Navigation may continue at the maximum speed until another input is received (e.g., an input indicative of a user touching the screen). Upon receiving the additional input, navigation may stop at the current location or may decelerate over time.

Figure 9:
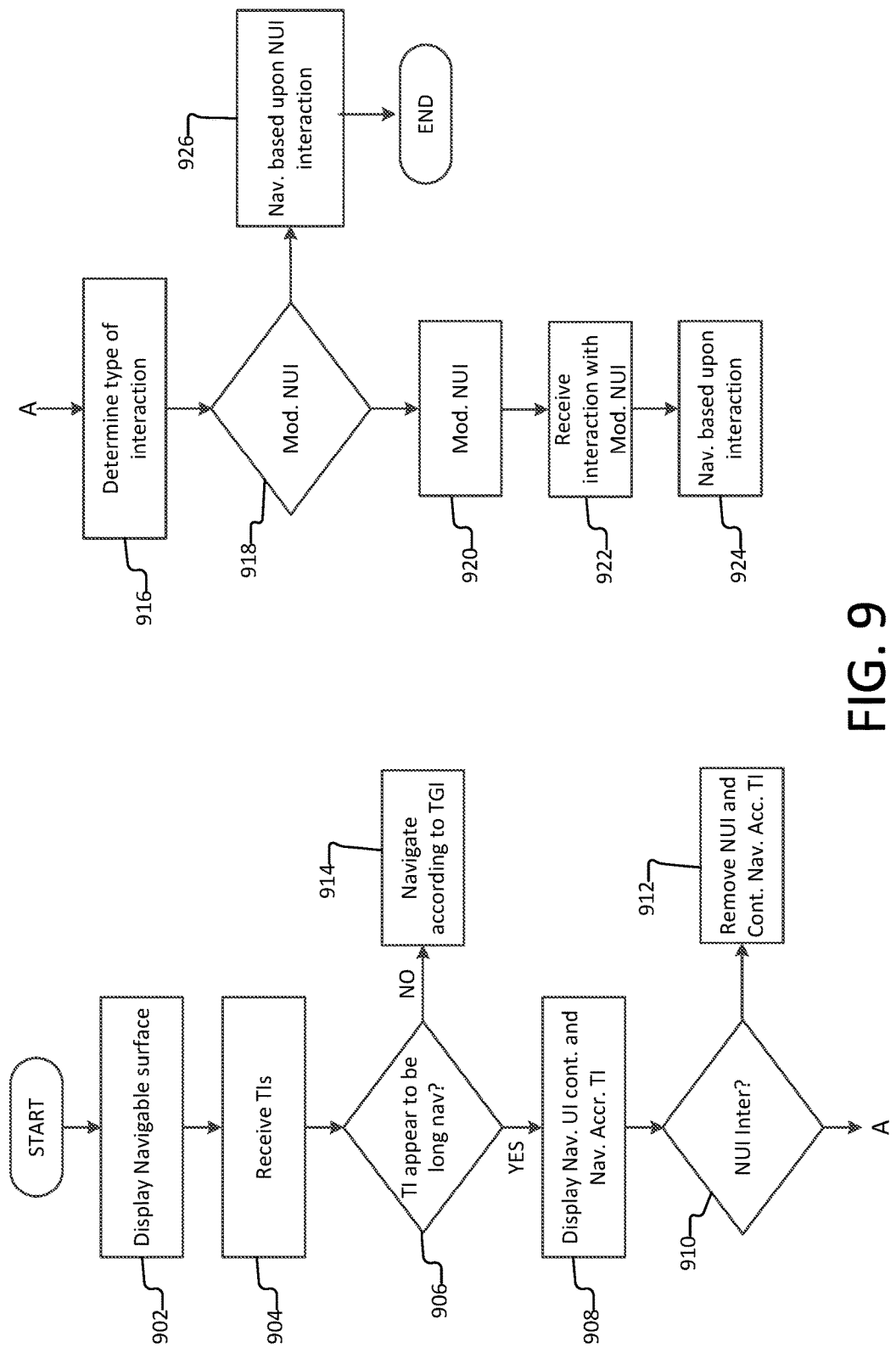
FIG. 9 is an exemplary method for adjusting a navigable surface displayed on a touch device based upon touch input.

FIG. 9 is an exemplary method 900 for adjusting a navigable surface displayed on a touch device based upon touch input. FIG. 9 may be performed using a computing device such as a smartphone, a laptop, a server, a smartwatch, a wearable device, etc. In certain aspects, a touch interface may be employed by the device performing the method 900. In other aspects, other types of interfaces may be employed, such as a mouse, a trackpad, a voice interface, or any other type of input interface. While the exemplary method 900 is described as receiving touch input, one of skill in the art will appreciate that other types of input may be received without departing from the spirit of this disclosure.

Flow begins at operation 902 where a navigable surface is displayed. A navigable surface may be any type of electronic surface that is capable of being navigated. Navigating a navigable surface may include adjusting the currently displayed view of the surface by scrolling, swiping, jumping to a point of interest, or otherwise traversing the surface. Exemplary navigable surfaces include, but are not limited to, web pages, documents, spreadsheets, home screens, desktops, presentations, diagrams, images, etc. In aspects, a navigable surface may be a single electronic object, such as, for example, a single image. Alternatively, a navigable surface may comprise multiple electronic objects. As an example, a spreadsheet including various tables, charts, images, etc. may be a navigable surface.

Flow continues to operation 904 where one or more inputs directed to the navigable surface are received. The one or more inputs may be received via interaction with the navigable surface itself. In certain aspects, the one or more inputs may be touch input received via a touch display. In such examples the one or more inputs may be touch inputs to slide the navigable surface in a particular direction. Alternatively, or additionally, the one or more touch inputs may be gesture inputs. For example, a flick gesture may be received. As previously noted, other types of inputs received from other types of interfaces may be received at operation 904 without departing from the scope of this disclosure.

Flow continues to decision operation 906 where a determination is made as to whether or not the received touch input(s) indicate that the user desires to perform a long distance traversal of the navigable surface. The determination may be based upon the received touch input. In one aspect, the determination may be based upon a type of touch gesture received. For example, receipt of a flick gesture indicates that the user desires to perform a long distance traversal. The number of touch gestures received may also be considered. For example, if repeated flicks are received, then it may be determined that the user desires to perform a long distance traversal. Conversely, a received touch gesture consists of the user touching and holding the display while sliding the display indicates that the user does not desire to perform a long distance traversal. Additionally, or alternatively, the determination may be based upon the number of touch inputs received within a predetermined period of time. For example, if a threshold number of inputs is received during a short amount of time, e.g., the user continues to move the navigable display, it may be determined that the user desires to perform a long distance traversal. While the disclosure provides specific factors that may be used to make the determination, one of skill in the art will appreciate that other factors may be used to determine whether the user's intent is a long distance traversal. If it is determined that a long distance traversal is not intended, flow branches NO to operation 908. At operation 908, navigation of the navigable surface is performed according to the received touch input. Performing the navigation at operation 908 includes adjusting the navigable surface in order to display content residing on a new portion of the navigable surface that was previously outside the display. The direction and degree of the adjustment may vary depending upon the touch input(s) received at operation 904.

Returning to decision operation 906, if a determination is made that a long distance traversal is intended, flow branches YES to operation 910. At operation 910 one or more navigational control UI elements may be displayed. The navigation control UI element(s) displayed may have different forms. For example, the navigation control UI element may be a scrollbar, a search interface, a button, a textual display object, a graphical display object, etc. For example, the exemplary navigational control UI elements depicted in FIGS. 2-6, 11-12, and 3-14 may be displayed at operation 910. In one example, the navigational control UI element may be positioned relative to the size indicator UI element. In one example, the navigational control UI element may be positioned along an axis that the navigable surface spans. In such examples, the navigational control UI element may be operable to facilitate traversal of the navigable surface along the axis upon which the navigational control UI element is placed. In alternate examples, the navigational control element may be operable to provide traversal of the navigable surface along both the horizontal vertical axes. For example, the navigational UI control may provide joystick-like capabilities with allow for 360 degrees of traversal. In still further aspects, other types of navigational control UI elements may provide the ability to directly jump to a specific position on the navigable surface. As previously discussed, the specific positions may be user defined or may be automatically determined by an application incorporating the navigational control UI element.

Alternatively, or additionally, one or more navigation zones may be activated at operation 910. The location of an activated navigation zone may depend upon the type of touch input received at operation 904. Regardless of whether operation 910 displays a navigational control UI element, activates a navigation zone, or performs both actions, navigation of the navigable surface may be simultaneously performed according to the received touch input. Similar to operation 908, performing the navigation at operation 910 includes adjusting the navigable surface in order to display content residing on a new portion of the navigable surface that was previously outside the display. The direction and degree of the adjustment may vary depending upon the touch input(s) received at operation 904.

Flow continues to operation 912 where a determination is made as to whether additional interaction is received by a navigational control UI element or, alternatively, by an activated navigation zone. If, after a predetermined amount of time, no additional input is received by the one or more navigational control UI elements and/or activated navigation zone(s), then flow branches NO to operation 914. At operation 914, any displayed navigational control UI elements may be removed from the display. It may be beneficial to remove the navigational control UI elements from the display due to the fact that the navigational control UI element may obstruct the content of the navigable surface, particularly if the method 900 is performed by a device having a small form factor or small display. In further aspects, any navigation zones that were activated during operation 910 may be deactivated during operation 914.

Returning to decision operation 912, if the displayed navigational control UI element (or activated navigation surface) receives additional input, flow branches YES to operation 916. At operation 916, the type of input or interaction received by the navigational control UI element (or activated navigation surface) is determined. In some aspects, different navigational control units or navigation zones may provide a user to interact with them in multiple different ways. For example, a navigational control UI element that is a scrollbar may provide the capability for the user to open a search prompt depending upon the type of input received by the scrollbar. If the navigational control UI element is a page up button, receiving a press or receiving a press and hold may perform different types of adjustments to the navigable surface.

Flow continues to decision operation 918 where a determination is made as to whether the received interaction causes a modification to the navigational control UI element. If no modification is required, flow branches to operation 920 where the navigable surface is traversed or adjusted based upon the input received by the navigational control UI element. The type of traversal performed may be dependent upon the type of navigational control UI element and/or the type of input received by the navigational control UI element. For example, if the navigational control UI element is a scrollbar, the traversal may be performed by scrolling the navigable content in the direction of the movement of the scrollbar. If the navigational control UI is a search interface, traversing the navigable content may be performed by displaying a portion of the navigable surface that is identified by received search parameters. The operations of the navigational control UI element(s) (or activated navigation zone(s)) allow the user to navigate the navigable surface easier than using traditional touch input functions.

Figure 12:
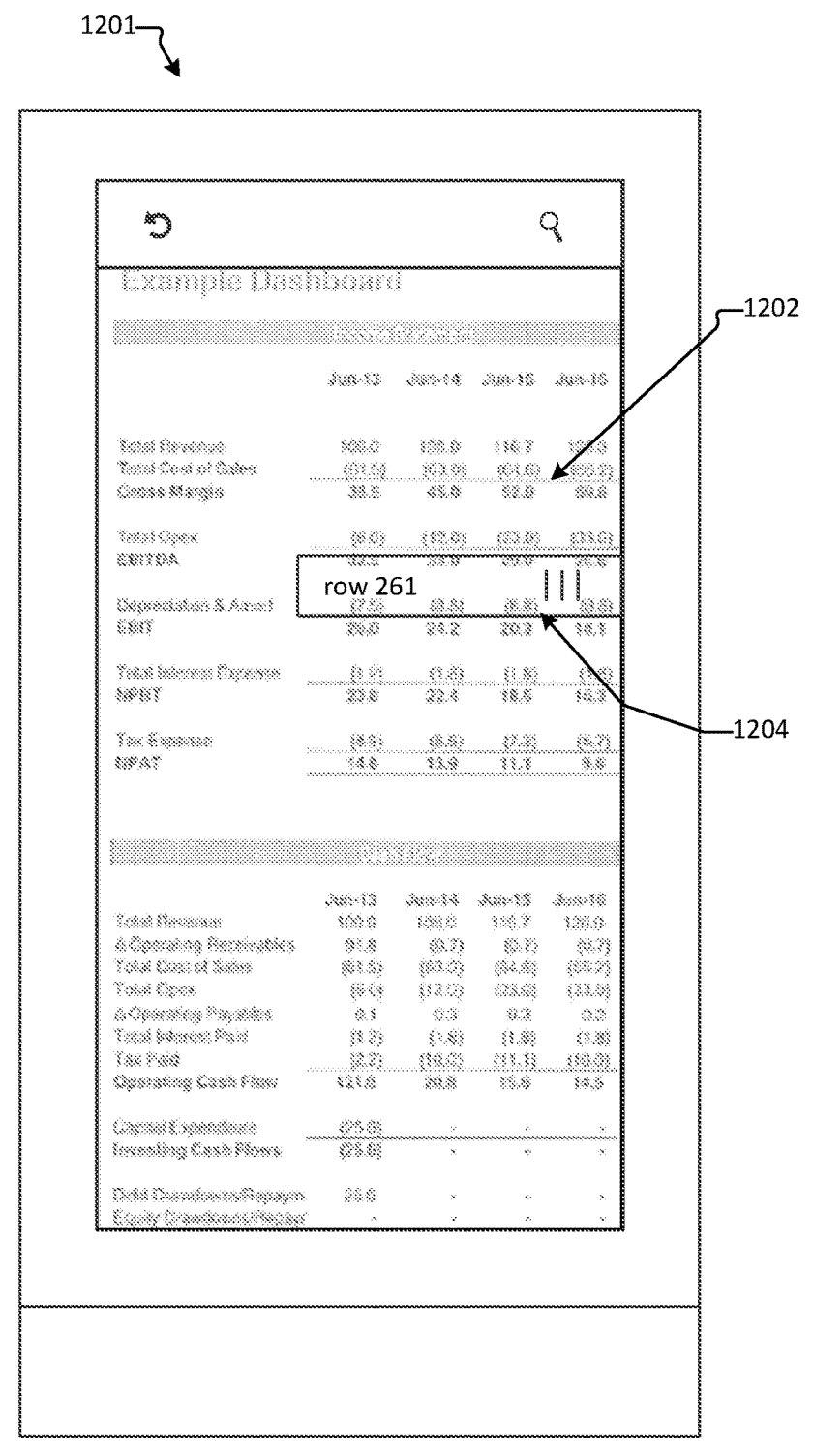

Returning to operation 918, if it is determined that the input received at operation should result in a modification of the navigational control UI element, then flow branches YES to operation 922. At operation 922, the navigational control UI element may be modified. In one aspect, modification of the navigational control UI element may comprise adding or removing a portion of the navigational control UI element. The addition may be based upon the traversal of the navigable surface. As an example, the navigational control UI element may be modified to display positional information as the navigable surface is traversed using the navigational control element. For example, referring to FIG. 11, a navigable surface 1102 is illustrated along with a scrollbar 1104. In the depicted aspect, the scrollbar 1104 is being manipulated to traverse the navigable surface. When the navigable surface is being traversed quickly, it may be hard for the user to tell where they are on the navigable surface. In order to help identify a current position on the navigable surface, the navigation control element may be modified to provide location related information. Location related information may include identifiable features of the navigable surface. For example, an image, a table, a chart, or any other type of identifiable feature of the navigable surface may be identified using the location related information. In the depicted example, the scrollbar may be modified to include a callout 1106 that displays a feature at the current position of the navigable surface. In the provided example, the callout 1106 displays an exemplary chart that is located at the current position of the navigable surface. The callout 1104 may be removed and/or modified to display other features as the user continues to traverse the navigable surface using the scrollbar 1104. FIG. 12 provides another exemplary modification of a navigational control element. In the depicted example, the scrollbar 1204 may be modified to include information about the current location on the navigable surface 1202. In the depicted example, a user may be traversing a large spreadsheet. The scrollbar 1204 is modified to display the row number of the current location on the navigable surface 1202.

Figure 14:
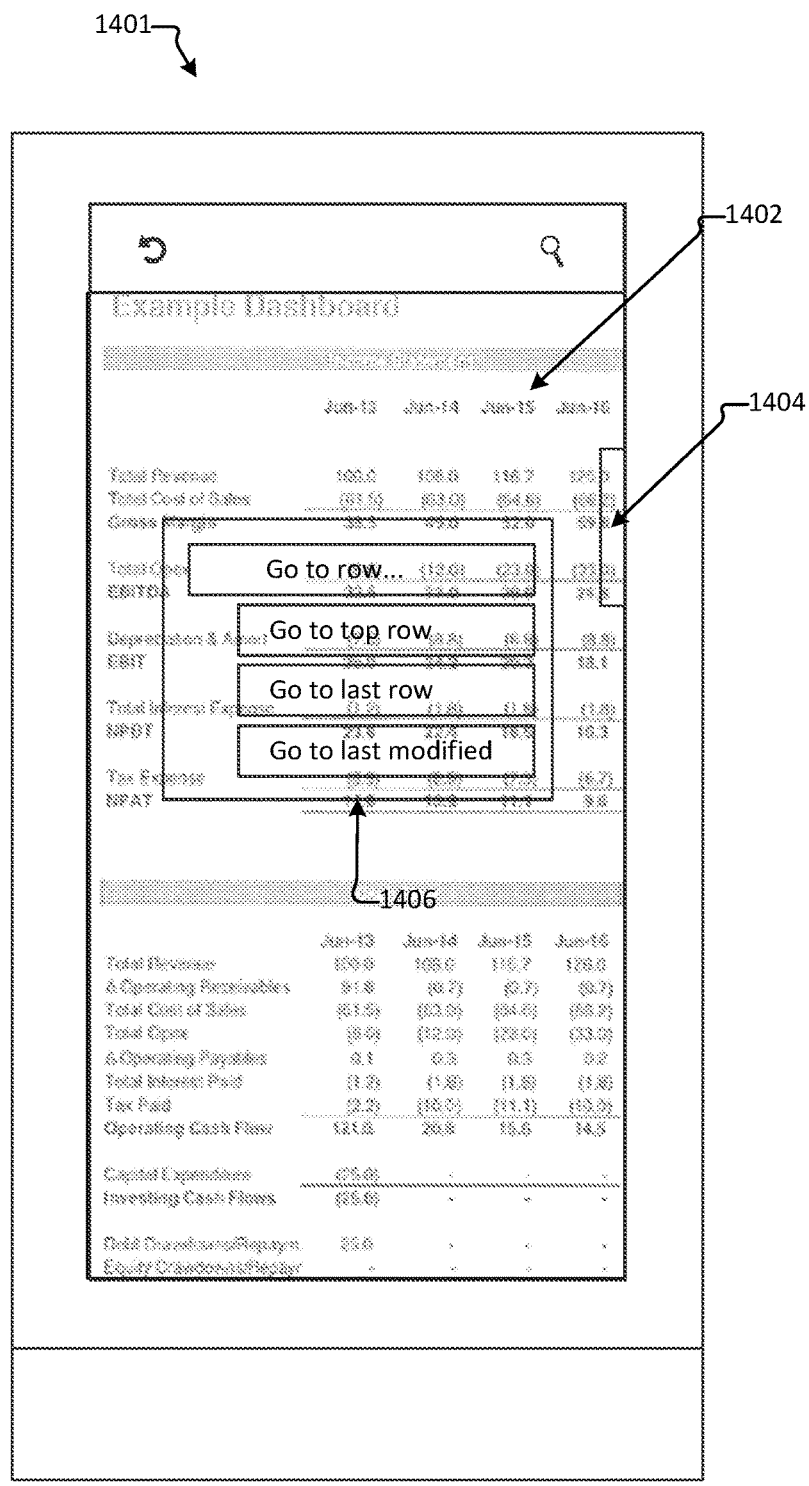
FIG. 14 depicts an exemplary search interface that may be employed with the aspects disclosed herein.

Alternatively, the modification to the navigational control UI element at operation 922 may include changing the form of the navigational control UI element. Changing the form of the navigational control UI element may provide additional capabilities that were previously not available. For example, referring to FIG. 13, a navigational control element operable to change forms is displayed. In the depicted example, a search bar 1302 is depicted positioned relative to a size indicator UI element 1304. The user can interact with the scrollbar 1302 to traverse the navigable surface. However, scrollbar 1302 also includes a search element. If the scrollbar 1304 receives a selection of the search element, the scrollbar may be modified to display a search interface. FIG. 14 depicts an exemplary search interface 1402 that may be employed with the aspects disclosed herein. In one aspect, the search interface 1402 may be displayed in response to receiving input by the search element that is part of scrollbar 1302 depicted in FIG. 13. However, one of skill in the art will appreciate that other actions may be performed to display the search interface 1402. The search interface 1402 may be operable to receive user input in the form of one or more search parameters. The search input may be received via keyboard, a soft keyboard, a speech recognition interface, etc. Upon receiving the one or more search parameters, a search may be performed to identify content that matches the one or more search parameters. Once the content is identified, the navigable surface may be automatically adjusted to display the identified content.

In certain aspects, the search interface may also include a size indicator 1404 that indicates the position of the currently displayed portion of the navigable surface in relation to the rest of the navigational surface. This provides the user with an understanding of what part of the navigable surface is currently on display. In other aspects, the search interface may contain a selection element 1406 that allows the user to select a portion of the navigable surface to jump to. The selectable portions may be based upon a feature of the navigable surface, such as a row number, a section number, a page number, an image, a chart, a table, etc. The selection element 1406 may also include short cuts to navigate to a portion of the navigable surface based upon prior user interaction. For example, the user may be able to jump to the portion of the navigable surface that was last modified by the user (e.g., changing the value of a cell, updating a chart, etc.).

Returning to FIG. 9, after modifying the navigational control UI element, flow continues to operation 294 were an additional interaction is received by the modified navigational control. The format of the received input may vary depending on the type of navigational control UI element that is displayed. For example, if the navigational control UI element is a scrollbar, the scrollbar may be manipulated by touching the and moving the scrollbar along an axis of movement. If the navigational control element is a search interface, search terms may be provided using a soft keyboard, a keyboard, an automatic speech recognition interface, or the like. Touch gestures may be used to manipulate the navigational control UI element. For example, the navigational control UI element may be dragged, flicked, held, or otherwise manipulated using a touch interface.

Flow continues to operation 926 where the navigable surface is adjusted based upon the interaction received by the modified navigational control UI element. The type of adjustment performed may be dependent upon the type of navigational control UI element and/or the type of input received by the navigational control UI element. For example, if the navigational control UI element is a scrollbar, the traversal may be performed by scrolling the navigable content in the direction of the movement of the scrollbar. If the navigational control UI is a search interface, traversing the navigable content may be performed by displaying a portion of the navigable surface that is identified by received search parameters.

Figure 10:
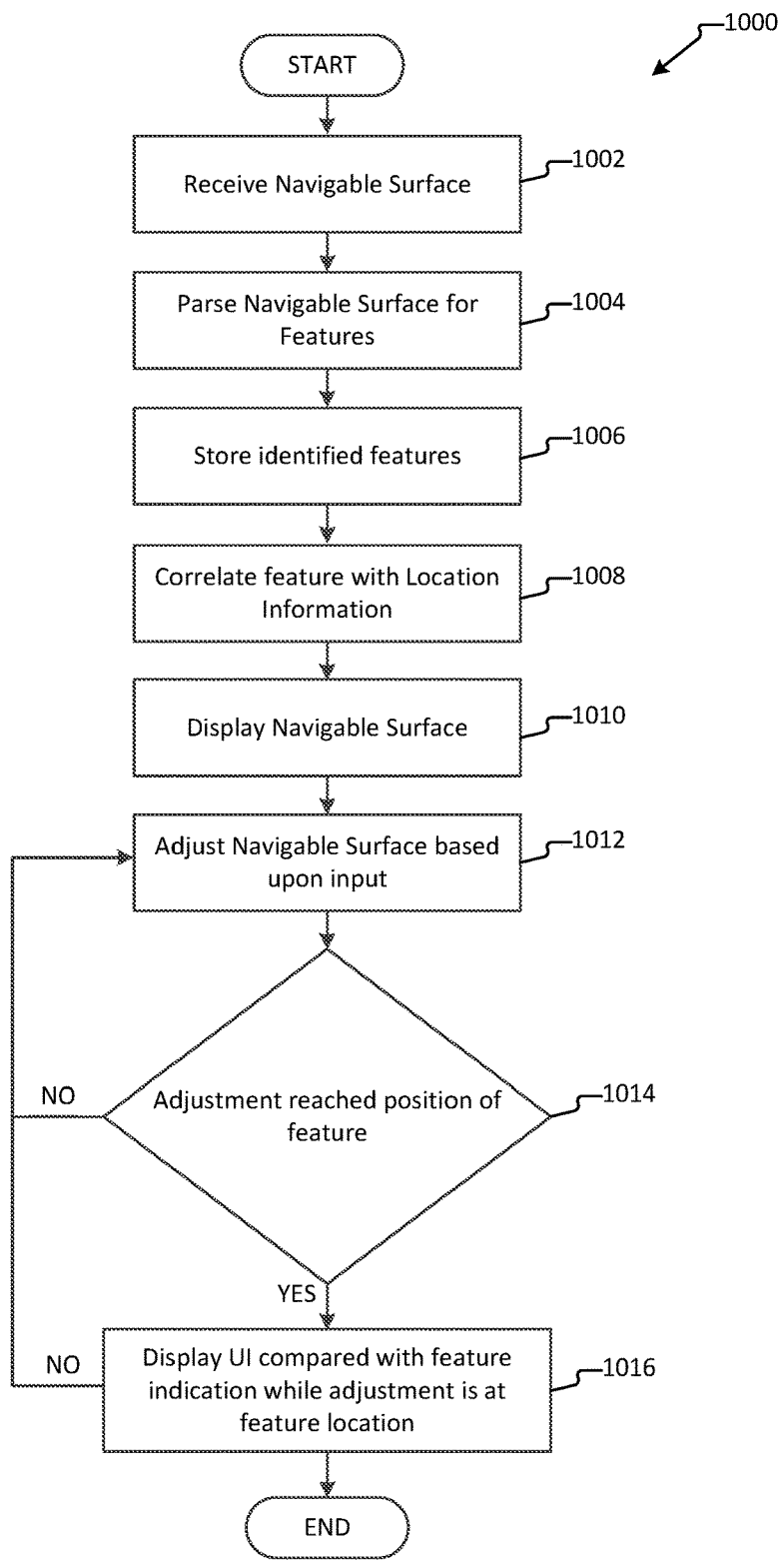
FIG. 10 depicts an exemplary method for determining features of a navigable surface.
Figure 11:
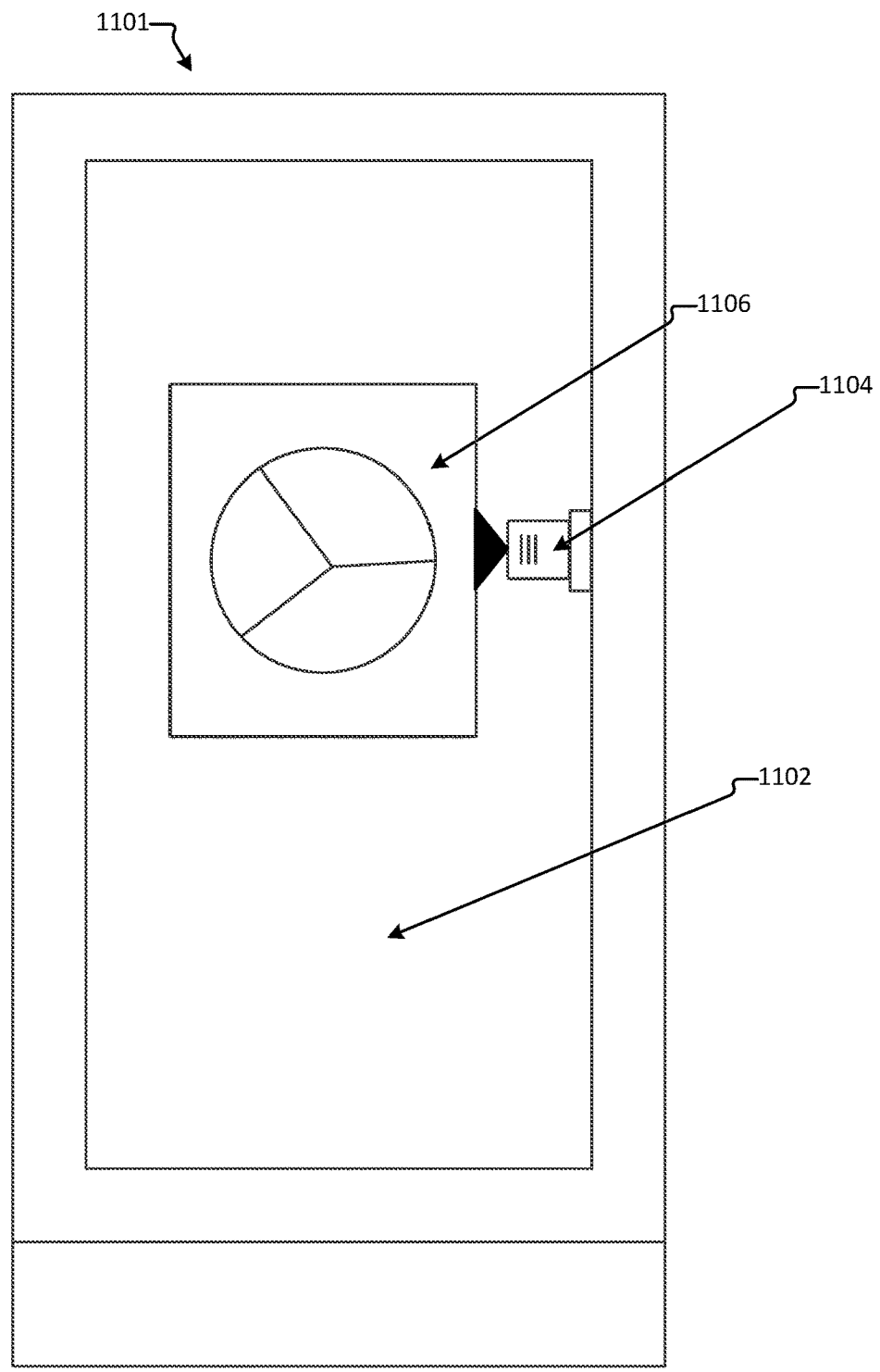
FIG. 11 depicts an exemplary callout that may be displayed during traversal of a navigable surface.
Figure 13:
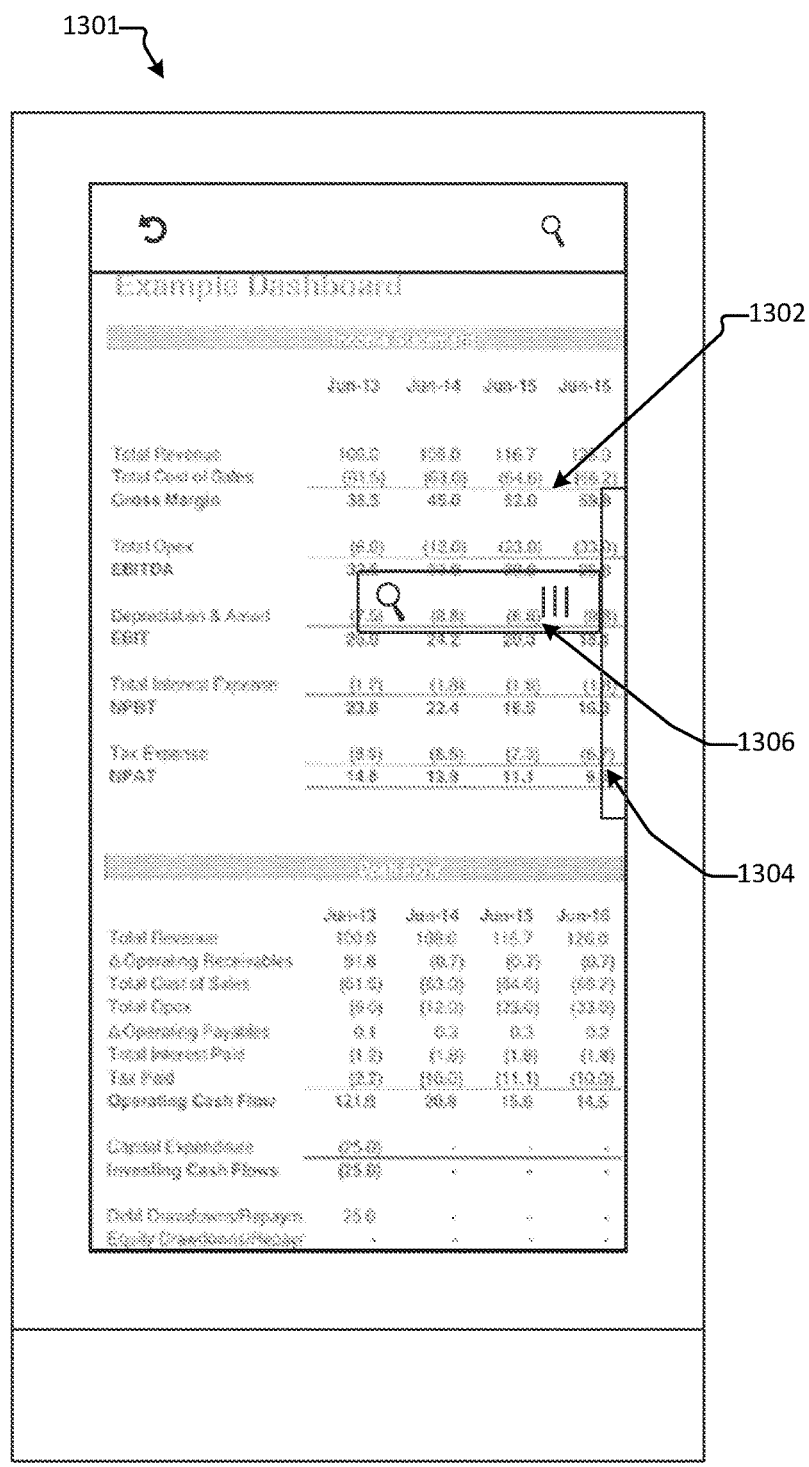
FIG. 13 illustrates a navigational control element operable to change forms.

As described throughout this disclosure, features of a navigable surface may be used during traversal of the surface. The features may be used to provide the user an indication of the current position of the navigable surface during traversal as depicted in FIGS. 11 and 12. Alternatively or additionally, the features may be used to navigate to a specific portion of the navigable surface as described with respect to the exemplary search interface of FIG. 14. The features of the navigable surface may be predefined based upon user input. Alternatively, features of the navigable surface may be automatically determined. FIG. 10 depicts an exemplary method 1000 for determining features of a navigable surface.

Flow begins at operation 1002 where a navigable surface is received. For example, a request to access the navigable surface may be received at operation 1002. The request may be opening or otherwise accessing a file such as a spreadsheet file, a document, a presentation, or a web page. Upon receiving the navigable surface, the navigable surface may be parsed at operation 1004. Parsing the navigable surface may include examining the different elements of the navigable surface to identify recognizable features. The types of recognizable features identified during the parsing operation may depend on the type of the navigable surface. For example, if the navigable surface is a spreadsheet, recognizable features may include row numbers, column numbers, tables, charts, graphs, shapes such as rectangular or triangular ranges, etc. If the navigable surface is a document, recognizable features may be page numbers, section number, paragraph numbers, section headers, embedded images or figures, and the like. If the navigable surface is a presentation, recognizable features may be a slide number, a slide title, a chart or graph, an image, etc. Other types of recognizable features may be identified without departing from the scope of this disclosure. Once the identifiable features are determined, the identified features may be stored at optional operation 1006. Storing the identified features may include storing information about the identified features, a representation of the recognizable features and/or metadata about the recognizable features. The information about the identified features may be stored in a separate file or in metadata for the navigable surface.

Flow continues to operation 1008 where the identified features are correlated with location information for the navigable surfaced. Correlation may include associating the identified feature with a specific portion of the navigable structure. For example, the coordinates of the navigable surface at which the recognizable feature is located may be associated with the recognizable feature. Any type of location information may be used to correlate the recognizable feature with a position on the navigable surface may be employed with the embodiments disclosed herein. A table or other data structure may be used to relate the coordinates with the identified feature.

At some point after the recognizable features are identified and correlated with location information, the navigable surface may be displayed at operation 1010. The navigable surface may be displayed on a touchscreen; however, the navigable surface may be displayed on other types of displays without departing from the scope of this disclosure. The navigable surface may be displayed in response to accessing an electronic object such as, for example, a file. As an example, the navigable surface may be displayed in response to opening a spreadsheet, a document, a presentation, upon accessing a website, upon startup of a device, etc. Displaying the navigable surface may also include displaying one or more navigational control UI elements operable to adjust the navigational surface. Flow continues to operation 1012 where the navigable surface is adjusted or traversed using the various navigational control UI components disclosed herein.

Flow continues to decision operation 1014 where a determination is made as to whether adjustment of the navigable surface has reached the location of an identified feature. The determination may be based off of the correlation performed in operation 1008. If the location of a feature is not reached during the traversal, flow branches NO and returns to operation 1012 where additional adjustments of the navigable surface are performed. If, however, the location of an identified feature has been reached, flow branches YES to operation 1016. At operation 1016, an indication that an identified feature has been may be displayed. The indication may take the form of a callout, such as the callout illustrated in FIG. 11, a modification of a navigational control UI element, as displayed in FIG. 12. Alternatively, other types of indications such as an audio indication or a tactile indication.

Figure 15:
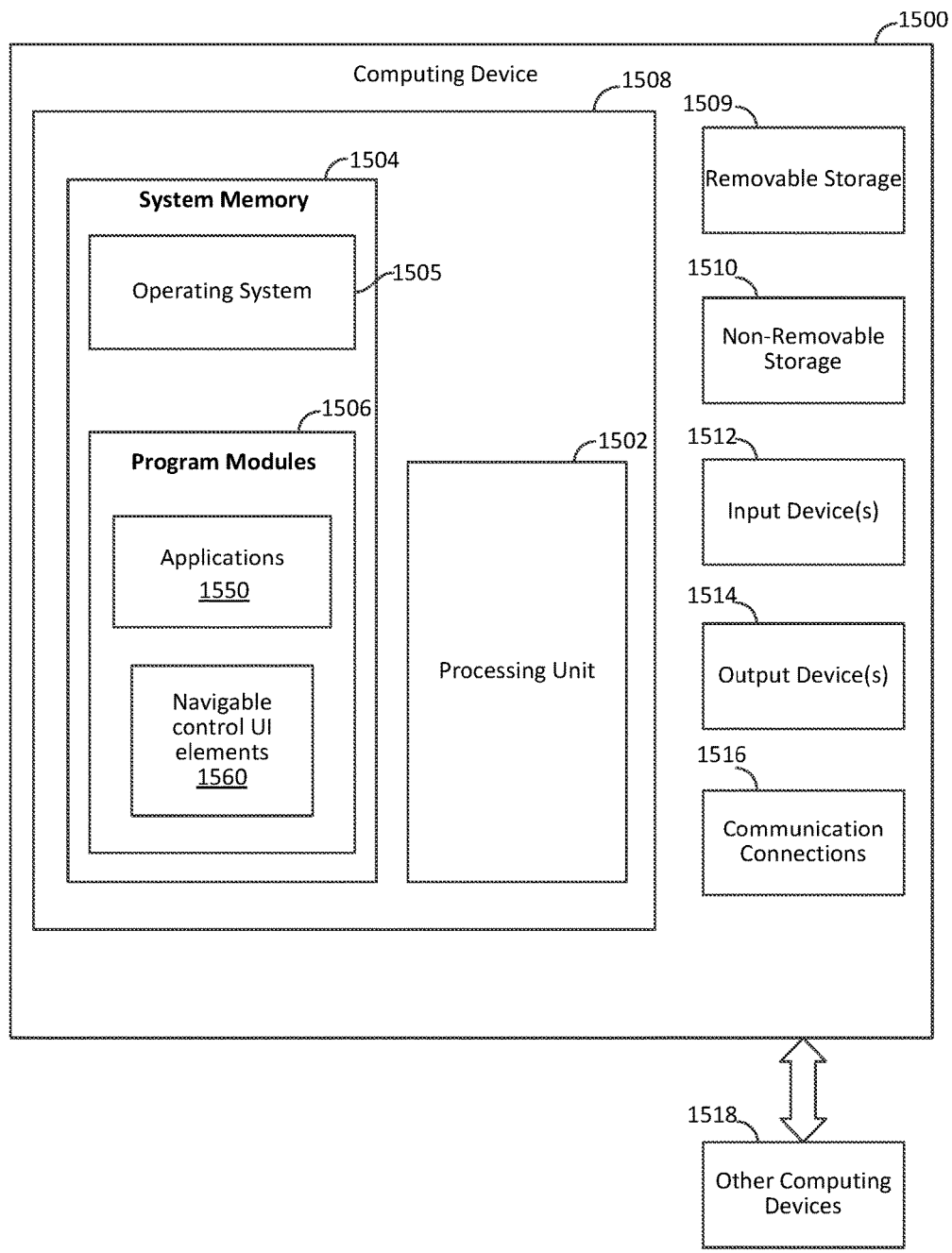
FIG. 15 is a block diagram illustrating example physical components of a computing device with which aspects of the disclosure may be practiced.
Figure 16A:
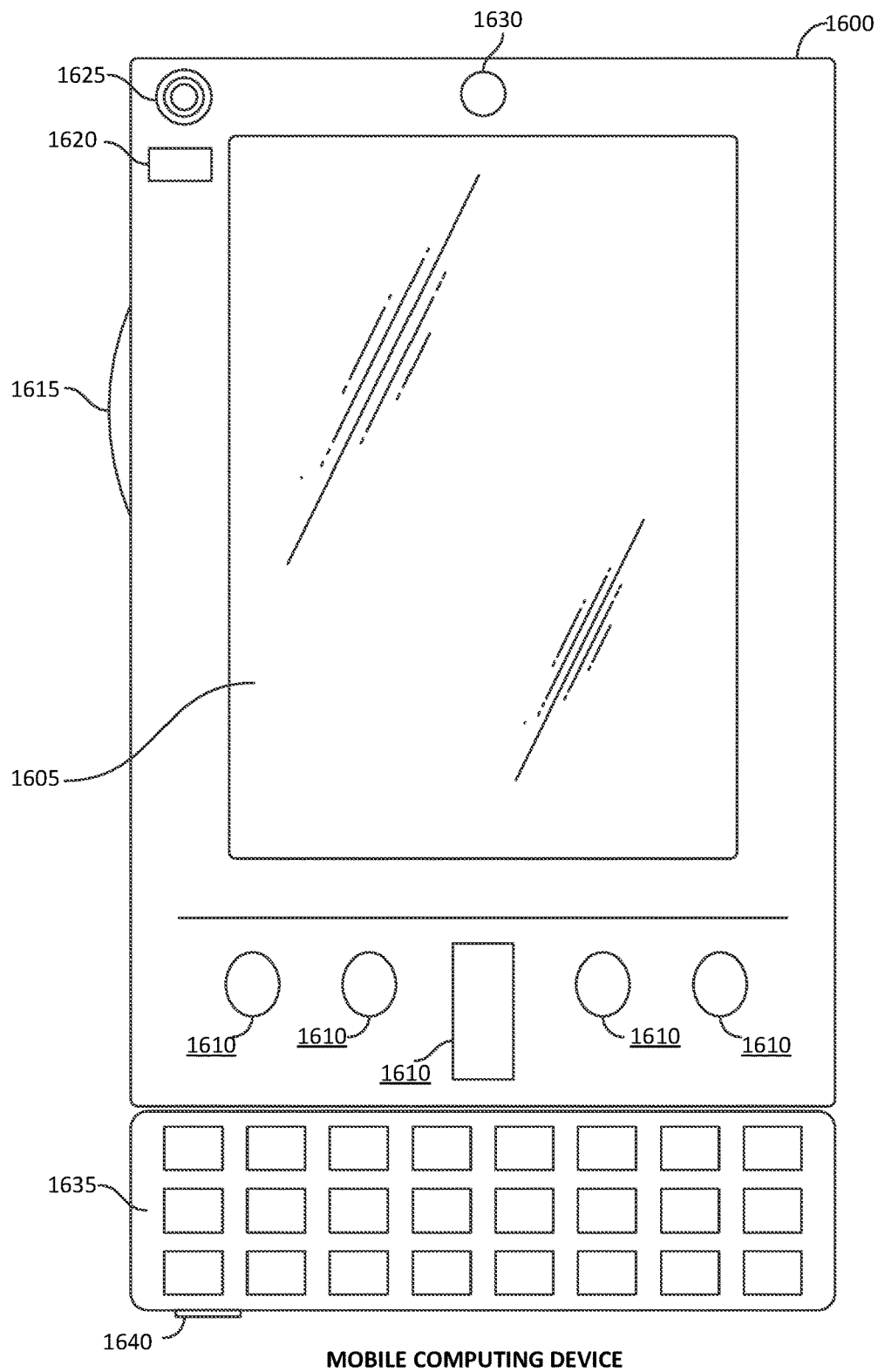
FIGS. 16A and 16B are simplified block diagrams of a mobile computing device with which aspects of the present disclosure may be practiced.
Figure 16B:
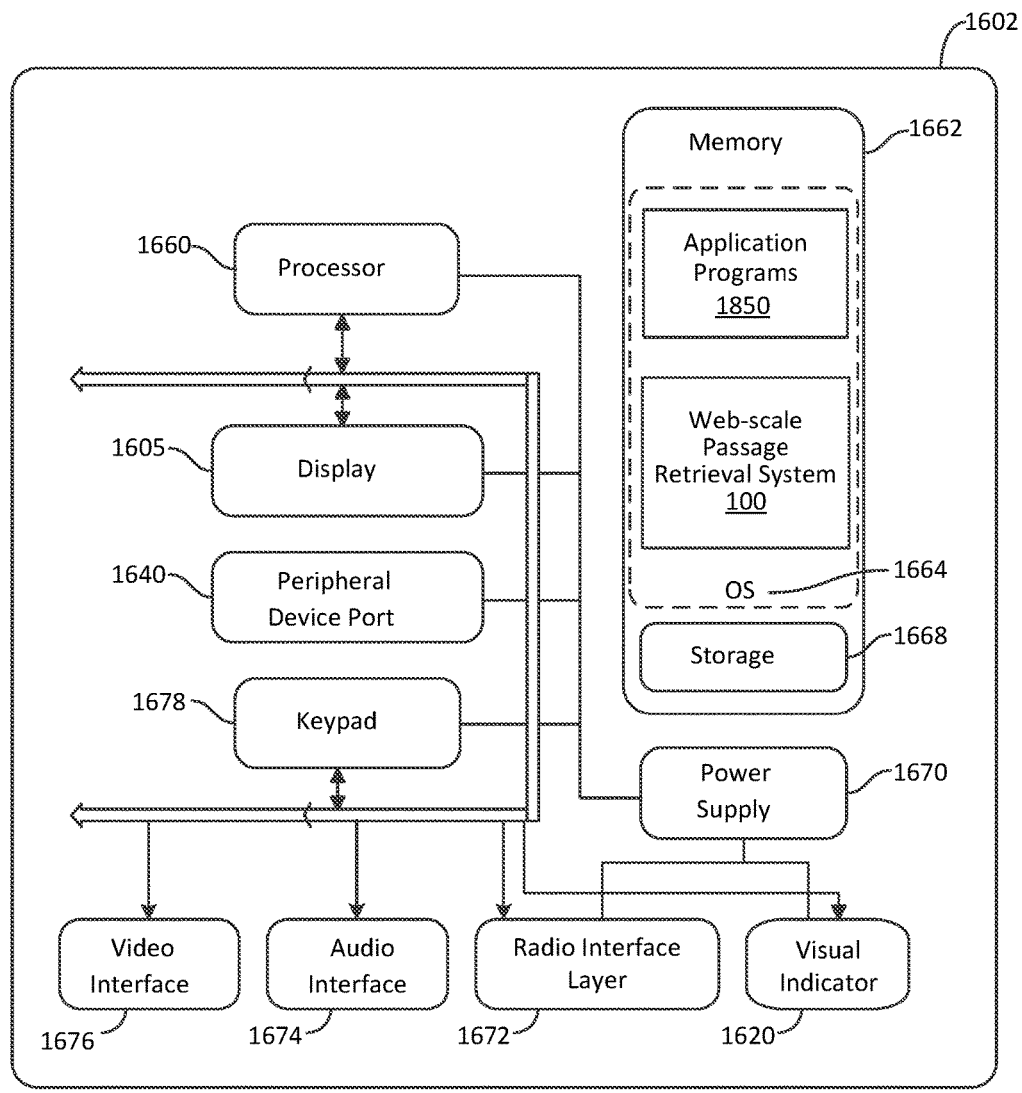
Figure 17:
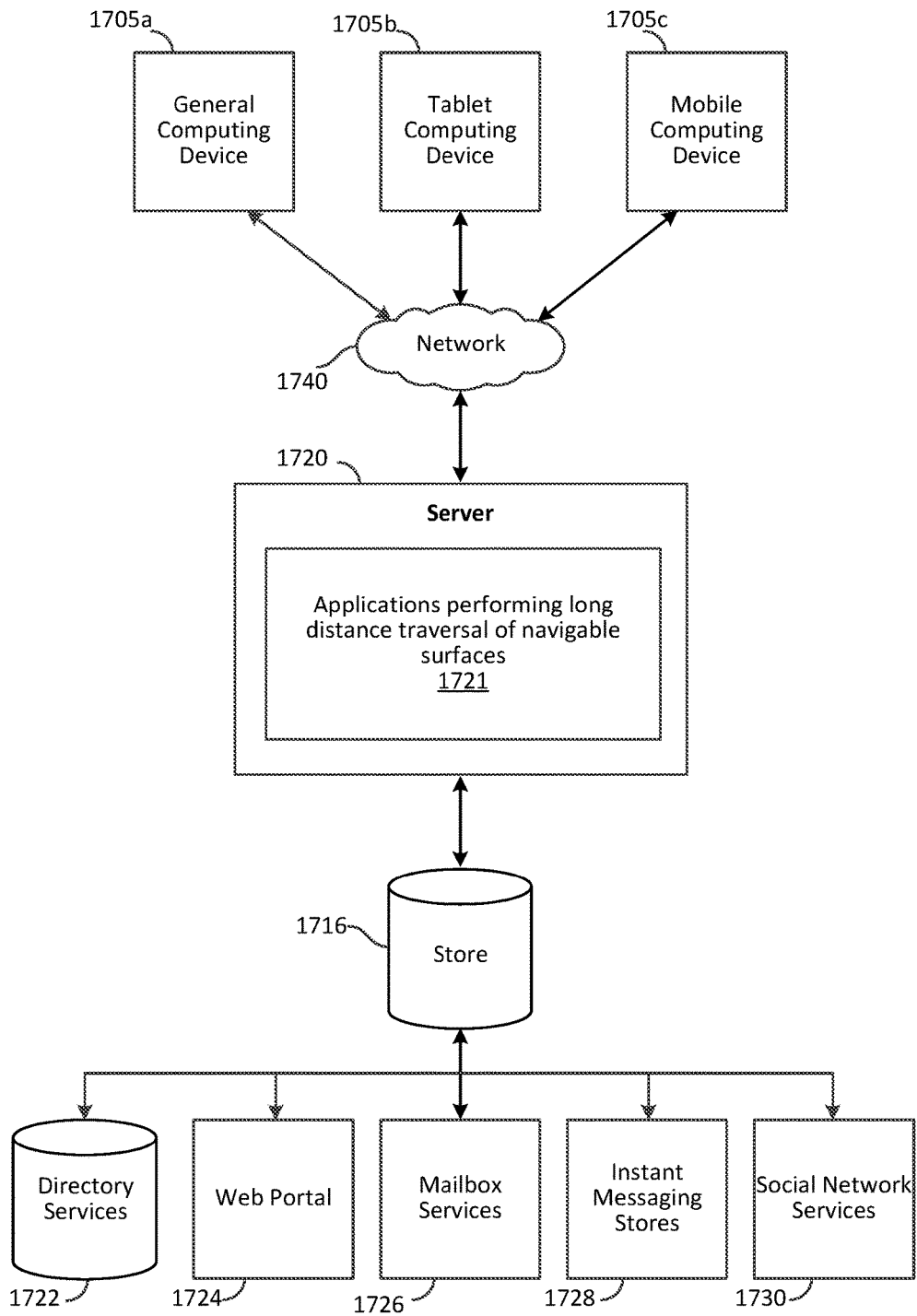
FIG. 17 is a simplified block diagram of a distributed computing system in which aspects of the present disclosure may be practiced.

FIGS. 15-17 and the associated descriptions provide a discussion of a variety of operating environments in which aspects of the disclosure may be practiced. However, the devices and systems illustrated and discussed with respect to FIGS. 15-17 are for purposes of example and illustration and are not limiting of a vast number of computing device configurations that may be utilized for practicing aspects of the disclosure, as described herein.

FIG. 15 is a block diagram illustrating physical components (e.g., hardware) of a computing device 1500 with which aspects of the disclosure may be practiced. The computing device components described below may have computer executable instructions for implementing a spreadsheet application 1520 on a computing device (e.g., server computing device 158 and/or client computing device 154), including computer executable instructions for spreadsheet application 1520 that can be executed to implement the methods disclosed herein. In a basic configuration, the computing device 1500 may include at least one processing unit 1502 and a system memory 1504. Depending on the configuration and type of computing device, the system memory 1504 may comprise, but is not limited to, volatile storage (e.g., random access memory), non-volatile storage (e.g., read-only memory), flash memory, or any combination of such memories. The system memory 1504 may include an operating system 1505 and one or more program modules 1506 suitable for applications that display a navigable surface 1550 and instructions to display and operate the navigable control UI elements 1560 disclosed herein.

The operating system 1505, for example, may be suitable for controlling the operation of the computing device 1500. Furthermore, embodiments of the disclosure may be practiced in conjunction with a graphics library, other operating systems, or any other application program and is not limited to any particular application or system. This basic configuration is illustrated in FIG. 15 by those components within a dashed line 1508. The computing device 1500 may have additional features or functionality. For example, the computing device 1500 may also include additional data storage devices (removable and/or non-removable) such as, for example, magnetic disks, optical disks, or tape. Such additional storage is illustrated in FIG. 15 by a removable storage device 1509 and a non-removable storage device 1510.

As stated above, a number of program modules and data files may be stored in the system memory 1504. While executing on the processing unit 1502, the program modules 1506 (e.g., spreadsheet application 1520) may perform processes including, but not limited to, the aspects, as described herein. Other program modules that may be used in accordance with aspects of the present disclosure, and in particular for associating images with cells of a spreadsheet, may include attribute component 1511, associate component 1513, operation component 1515, and/or UX component 1517, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 15 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 1500 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 1500 may also have one or more input device(s) 1512 such as a keyboard, a mouse, a pen, a sound or voice input device, a touch or swipe input device, etc. The output device(s) 1514 such as a display, speakers, a printer, etc. may also be included. The aforementioned devices are examples and others may be used. The computing device 1500 may include one or more communication connections 1516 allowing communications with other computing devices. Examples of suitable communication connections 1516 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 1504, the removable storage device 1509, and the non-removable storage device 1510 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 1500. Any such computer storage media may be part of the computing device 1500. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 16A and 16B illustrate a mobile computing device 1600, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 16A, one aspect of a mobile computing device 1600 for implementing the aspects is illustrated. In a basic configuration, the mobile computing device 1600 is a handheld computer having both input elements and output elements. The mobile computing device 1600 typically includes a display 1605 and one or more input buttons 1610 that allow the user to enter information into the mobile computing device 1600. The display 1605 of the mobile computing device 1600 may also function as an input device (e.g., a touch screen display). If included, an optional side input element 1615 allows further user input. The side input element 1615 may be a rotary switch, a button, or any other type of manual input element. In alternative aspects, mobile computing device 1600 may incorporate more or less input elements. For example, the display 1605 may not be a touch screen in some embodiments. In yet another alternative embodiment, the mobile computing device 1600 is a portable phone system, such as a cellular phone. The mobile computing device 1600 may also include an optional keypad 1635. Optional keypad 1635 may be a physical keypad or a "soft" keypad generated on the touch screen display. In various embodiments, the output elements include the display 1605 for showing a graphical user interface (GUI), a visual indicator 1620 (e.g., a light emitting diode), and/or an audio transducer 1625 (e.g., a speaker). In some aspects, the mobile computing device 1600 incorporates a vibration transducer for providing the user with tactile feedback. In yet another aspect, the mobile computing device 1600 incorporates input and/or output ports, such as an audio input (e.g., a microphone jack), an audio output (e.g., a headphone jack), and a video output (e.g., a HDMI port) for sending signals to or receiving signals from an external device.

FIG. 16B is a block diagram illustrating the architecture of one aspect of a mobile computing device. That is, the mobile computing device 1600 can incorporate a system (e.g., an architecture) 1602 to implement some aspects. In one embodiment, the system 1602 is implemented as a "smart phone" capable of running one or more applications (e.g., browser, e-mail, calendaring, contact managers, messaging clients, games, and media clients/players). In some aspects, the system 1602 is integrated as a computing device, such as an integrated personal digital assistant (PDA) and wireless phone.

One or more application programs 1666 may be loaded into the memory 1662 and run on or in association with the operating system 1664. Examples of the application programs include phone dialer programs, e-mail programs, personal information management (PIM) programs, word processing programs, spreadsheet programs, Internet browser programs, messaging programs, and so forth. The system 1602 also includes a non-volatile storage area 1668 within the memory 1662. The non-volatile storage area 1668 may be used to store persistent information that should not be lost if the system 1602 is powered down. The application programs 1666 may use and store information in the non-volatile storage area 1668, such as email or other messages used by an email application, and the like. A synchronization application (not shown) also resides on the system 1602 and is programmed to interact with a corresponding synchronization application resident on a host computer to keep the information stored in the non-volatile storage area 1668 synchronized with corresponding information stored at the host computer. As should be appreciated, other applications may be loaded into the memory 1662 and run on the mobile computing device 1600, including the instructions for associating one or more images with one or more cells of a spreadsheet as described herein (e.g., attribute component, associate component, array component, hybrid component, operation component, and/or UX component, etc.).

The system 1602 has a power supply 1670, which may be implemented as one or more batteries. The power supply 1670 may further include an external power source, such as an AC adapter or a powered docking cradle that supplements or recharges the batteries. The system 1602 may also include a radio interface layer 1672 that performs the function of transmitting and receiving radio frequency communications. The radio interface layer 1672 facilitates wireless connectivity between the system 1602 and the "outside world," via a communications carrier or service provider. Transmissions to and from the radio interface layer 1672 are conducted under control of the operating system 1664. In other words, communications received by the radio interface layer 1672 may be disseminated to the application programs 1666 via the operating system 1664, and vice versa.

The visual indicator 1620 may be used to provide visual notifications, and/or an audio interface 1674 may be used for producing audible notifications via an audio transducer 1625 (e.g., audio transducer 1625 illustrated in FIG. 16A). In the illustrated embodiment, the visual indicator 1620 is a light emitting diode (LED) and the audio transducer 1625 may be a speaker. These devices may be directly coupled to the power supply 1670 so that when activated, they remain on for a duration dictated by the notification mechanism even though the processor 1660 and other components might shut down for conserving battery power. The LED may be programmed to remain on indefinitely until the user takes action to indicate the powered-on status of the device. The audio interface 1674 is used to provide audible signals to and receive audible signals from the user. For example, in addition to being coupled to the audio transducer 1625, the audio interface 1674 may also be coupled to a microphone to receive audible input, such as to facilitate a telephone conversation. In accordance with embodiments of the present disclosure, the microphone may also serve as an audio sensor to facilitate control of notifications, as will be described below. The system 1602 may further include a video interface 1676 that enables an operation of peripheral device 1630 (e.g., on-board camera) to record still images, video stream, and the like.

A mobile computing device 1600 implementing the system 1602 may have additional features or functionality. For example, the mobile computing device 1600 may also include additional data storage devices (removable and/or non-removable) such as, magnetic disks, optical disks, or tape. Such additional storage is illustrated in FIG. 16B by the non-volatile storage area 1668.

Data/information generated or captured by the mobile computing device 1600 and stored via the system 1602 may be stored locally on the mobile computing device 1600, as described above, or the data may be stored on any number of storage media that may be accessed by the device via the radio interface layer 1672 or via a wired connection between the mobile computing device 1600 and a separate computing device associated with the mobile computing device 1600, for example, a server computer in a distributed computing network, such as the Internet. As should be appreciated such data/information may be accessed via the mobile computing device 1600 via the radio interface layer 1672 or via a distributed computing network. Similarly, such data/information may be readily transferred between computing devices for storage and use according to well-known data/information transfer and storage means, including electronic mail and collaborative data/information sharing systems.

As should be appreciated, FIGS. 16A and 16B are described for purposes of illustrating the present methods and systems and is not intended to limit the disclosure to a particular sequence of steps or a particular combination of hardware or software components.

FIG. 17 illustrates one aspect of the architecture of a system for processing data received at a computing system from a remote source, such as a general computing device 1704 (e.g., personal computer), tablet computing device 1706, or mobile computing device 1708, as described above. Content displayed at server device 1702 may be stored in different communication channels or other storage types. For example, various documents may be stored using a directory service 1722, a web portal 1724, a mailbox service 1726, an instant messaging store 1728, or a social networking service 1730. The spreadsheet application 1721 may be employed by a client that communicates with server device 1702, and/or the application displaying the navigable surface 1721 may be employed by server device 1720. The server device 1720 may provide data to and from a client computing device such as a general computing device 1704, a tablet computing device 1706 and/or a mobile computing device 1708 (e.g., a smart phone) through a network 1715. By way of example, the aspects described above with respect to FIGS. 1-14 may be embodied in a general computing device 1704 (e.g., personal computer), a tablet computing device 1706 and/or a mobile computing device 1708 (e.g., a smart phone). Any of these embodiments of the computing devices may obtain content from the store 1716, in addition to receiving graphical data useable to either be pre-processed at a graphic-originating system or post-processed at a receiving computing system.

As should be appreciated, FIG. 17 is described for purposes of illustrating the present methods and systems and is not intended to limit the disclosure to a particular sequence of steps or a particular combination of hardware or software components.

Figure 18:
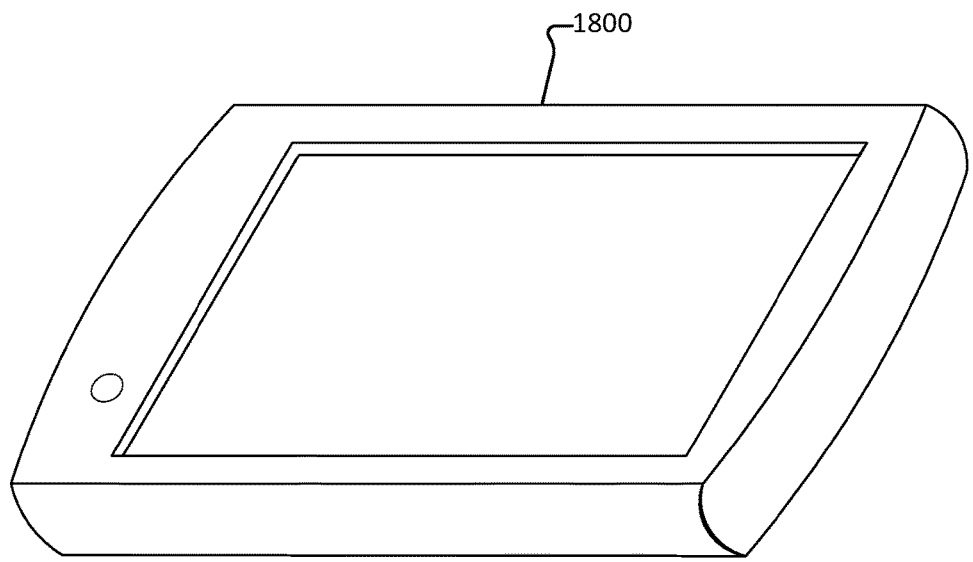
FIG. 18 illustrates a tablet computing device for executing one or more aspects of the present disclosure.

FIG. 18 illustrates an exemplary tablet computing device 1800 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

As should be appreciated, FIG. 18 is described for purposes of illustrating the present methods and systems and is not intended to limit the disclosure to a particular sequence of steps or a particular combination of hardware or software components.

Among other examples, aspects disclosed herein provide system comprising: at least one processing unit; and at least one memory storing computer executable instructions that, when executed by the at least one processing unit, cause the system to perform a method, the method comprising: displaying, on a touch display, a navigable surface comprising a size indicator indicative of the size of the navigable surface, the size indicator having a first size, wherein the first sized is determined based upon the navigable surface; receiving one or more touch inputs on the navigable surface; determining, based upon the one or more touch inputs, whether long distance traversal is intended; and when long distance traversal is intended, displaying a navigational control, wherein the navigational control is operable to control long distance traversal of the navigable surface. In further examples displaying the navigational control comprises displaying the navigational control over at least a portion of the navigable surface while concurrently adjusting the navigable surface in accordance with the one or more touch inputs. In further examples, the method further comprises: determining whether the navigational control has received additional input; and when the navigational control has not received additional input, removing the navigational control after a predetermined period of time. In further examples, the method further comprises: receiving one or more additional touch inputs at the navigational control; and adjusting the navigable display based upon the one or more additional inputs. In further examples, the navigational control is a scrollbar positioned relative to the size indicator, the scrollbar having a second size that is different from the first size. In further examples, the scrollbar is operable to adjust the navigable surface along an axis that the scrollbar is positioned on, and wherein the scrollbar is positioned on one of a vertical axis and a horizontal access. In further examples, the scrollbar comprises at least one additional control object, and wherein the at least one additional control object comprises: a search control; a home control operable to return the navigable surface to an initial position; and an end control operable to return the navigable surface to a final position.

Additional aspects disclosed herein provide a method comprising: displaying, on a touch display, a navigable surface comprising a size indicator indicative of the size of the navigable surface, the size indicator having a first size, wherein the first sized is determined based upon the navigable surface; receiving one or more touch inputs on the navigable surface; determining, based upon the one or more touch inputs, whether long distance traversal is intended; and when long distance traversal is intended, displaying a navigational control, wherein the navigational control is operable to control long distance traversal of the navigable surface. In further examples the navigational control comprises one of: a scrollbar; a page up control; a page down control; a home control; an end control; and a search interface. In further examples, the size of the scrollbar is determined based upon the navigable surface. In further examples, the size of the scrollbar is determined based upon the length of an edge of the touch display. In further examples, the method further comprises parsing the navigable surface to identify one or more recognizable features; and correlating the one or more recognizable features with location information. In further examples, the method further comprises receiving, at the navigational control, an additional touch input; and in response to receiving the additional touch input, adjusting the navigable surface according to the functionality of the navigable control. In further examples, the method further comprises during the adjustment of the navigable surface, determining whether the position of a recognizable feature has been reached; and when the position of the recognizable feature has been reached, modifying the navigable control to display an indicator of the navigable feature. In further examples, modifying the navigable control comprises displaying a callout illustrating the recognizable feature.

Additional aspects disclosed herein provide a computer storage medium encoding computer executable instructions that, when executed by at least one processor, perform a method comprising: displaying, on a touch display, a navigable surface comprising a size indicator indicative of the size of the navigable surface, the size indicator having a first size, wherein the first sized is determined based upon the navigable surface; receiving one or more touch inputs on the navigable surface; determining, based upon the one or more touch inputs, whether long distance traversal is intended; and when long distance traversal is intended, displaying a navigational control, wherein the navigational control is operable to control long distance traversal of the navigable surface. In further examples, displaying the navigational control displaying the navigational control over at least a portion of the navigable surface while concurrently adjusting the navigable surface in accordance with the one or more touch inputs. In further examples, the method further comprises: determining whether the navigational control has received additional input; and when the navigational control has not received additional input, removing the navigational control after a predetermined period of time. In further examples, the method further comprises: receiving one or more additional touch inputs at the navigational control; and adjusting the navigable display based upon the one or more additional inputs.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system with control user interface with long distance traversals, the system comprising:
    at least one processing unit; and
    at least one memory storing computer executable instructions that, when executed by the at least one processing unit, cause the system to perform a method, the method comprising:
        displaying, on a touch display, a portion of a navigable surface comprising a size indicator indicative of the size of the navigable surface, wherein the size of the navigable surface is larger than a size of the touch display, the size indicator having a first size, and wherein the first size is based upon the size of the navigable surface;
        providing a first navigational control in proximity to the size indicator, wherein the first navigational control provides a traversal over the navigable surface at a first distance upon a selection of the first navigational control, and wherein a size of the first navigational control is less than the first size;
        receiving one or more touch inputs on the navigable surface;
        determining an intent to perform long distance traversal based at least in part on a pattern of one or more received touch inputs, wherein the pattern comprises one or more flick operation over the portion of the navigable surface; and
        responsive to the determined intent, providing a second navigational control, wherein the second navigational control is operable to control traversal of the navigable surface at a second distance, wherein the second distance is longer than the first distance.

2. The system of claim 1, wherein displaying the second navigational control comprises displaying the second navigational control over at least the portion of the navigable surface while concurrently adjusting the navigable surface in accordance with the one or more touch inputs.

3. The system of claim 1, wherein the method further comprises:
    determining whether the second navigational control has received additional input; and
    when the second navigational control has not received additional input, removing the second navigational control after a predetermined period of time.

4. The system of claim 1, wherein the method further comprises:
    receiving one or more additional touch inputs at the second navigational control; and
    adjusting the navigable display based upon the one or more additional inputs.

5. The system of claim 1, wherein the second navigational control is a scrollbar positioned relative to the size indicator, the scrollbar having a second size that is different from the first size.

6. The system of claim 5, wherein the scrollbar is operable to adjust the navigable surface along an axis that the scrollbar is positioned on, and wherein the scrollbar is positioned on one of a vertical axis and a horizontal access.

7. The system of claim 5, wherein the scrollbar comprises at least one additional control object, and wherein the at least one additional control object comprises:
    a search control;
    a home control operable to return the navigable surface to an initial position; and
    an end control operable to return the navigable surface to a final position.

8. A method for controlling user interface with long distance traversals, the method comprising:
    displaying, on a touch display, a portion of a navigable surface comprising a size indicator indicative of the size of the navigable surface, wherein the size of the navigable surface is larger than a size of the touch display, the size indicator having a first size, and wherein the first size is based upon the size of the navigable surface;
    providing a first navigational control in proximity to the size indicator, wherein the first navigational control provides a traversal over the navigable surface at a first distance upon a selection of the first navigational control, and wherein a size of the first navigational control is less than the first size;

receiving one or more touch inputs on the navigable surface;

determining an intent to perform long distance traversal based at least in part on a pattern of one or more received touch inputs, wherein the pattern comprises one or more flick operation over the portion of the navigable surface; and responsive to the determined intent, providing a second navigational control, wherein the second navigational control is operable to control traversal of the navigable surface at a second distance, wherein the second distance is longer than the first distance.

9. The method of claim 8, wherein the second navigational control comprises one of:
a scrollbar;
a page up control;
a page down control;
a home control;
an end control; and
a search interface.

10. The method of claim 9, wherein the size of the scrollbar is determined based upon the navigable surface.

11. The method of claim 9, wherein the size of the scrollbar is determined based upon the length of an edge of the touch display.

12. The method of claim 8, further comprising:
parsing the navigable surface to identify one or more recognizable features; and
correlating the one or more recognizable features with location information.

13. The method of claim 12, further comprising:
receiving, at the second navigational control, an additional touch input; and
in response to receiving the additional touch input, adjusting the navigable surface according to the functionality of the second navigational control.

14. The method of claim 13, further comprising:
during the adjustment of the navigable surface, determining whether the position of a recognizable feature has been reached; and
when the position of the recognizable feature has been reached, modifying the second navigational control to display an indicator of the navigable feature.

15. The method of claim 14, wherein modifying the second navigational control comprises displaying a callout, wherein the callout comprises a visual exemplary representation of the recognizable feature at the position, and wherein the recognizable feature comprises at least one of a table, a graph, a chart, or an image.

16. A computer storage medium encoding computer executable instructions that, when executed by at least one processor, perform a method for controlling user interface with long distance traversals, the method comprising:
displaying, on a touch display, a portion of a navigable surface comprising a size indicator indicative of the size of the navigable surface, wherein the size of the navigable surface is larger than a size of the touch display, the size indicator having a first size, and wherein the first size is based upon the size of the navigable surface;

providing a first navigational control in proximity to the size indicator, wherein the first navigational control provides a traversal over the navigable surface at a first distance upon a selection of the first navigational control, and wherein a size of the first navigational control is less than the first size;

receiving one or more touch inputs on the navigable surface;

determining an intent to perform long distance traversal based at least in part on a pattern of one or more received touch inputs, wherein the pattern comprises one or more flick operation over the portion of the navigable surface; and responsive to the determined intent, providing a second navigational control, wherein the second navigational control is operable to control traversal of the navigable surface at a second distance, wherein the second distance is longer than the first distance.

17. The computer storage medium of claim 16, wherein displaying the second navigational control displaying the second navigational control over at least the portion of the navigable surface while concurrently adjusting the navigable surface in accordance with the one or more touch inputs.

18. The computer storage medium of claim 16, wherein the method further comprises:
determining whether the second navigational control has received additional input; and
when the second navigational control has not received additional input, removing the second navigational control after a predetermined period of time.

19. The computer storage medium of claim 16, wherein the method further comprises:
receiving one or more additional touch inputs at the second navigational control; and
adjusting the navigable display based upon the one or more additional inputs.

20. The computer storage medium of claim 16, wherein the second navigational control comprises one of:
a scrollbar;
a page up control;
a page down control;
a home control;
an end control; and
a search interface.

* * * * *